United States Patent
Itoh et al.

(10) Patent No.: US 10,622,907 B2
(45) Date of Patent: Apr. 14, 2020

(54) DC-DC CONVERTER

(71) Applicant: Murata Manufacturing Co., Ltd., Nagaokakyo-shi, Kyoto-fu (JP)

(72) Inventors: Junichi Itoh, Nagaoka (JP); Hayato Higa, Nagaoka (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/554,936

(22) Filed: Aug. 29, 2019

(65) Prior Publication Data
US 2019/0386572 A1 Dec. 19, 2019

Related U.S. Application Data

(63) Continuation of application No. PCT/JP2018/006393, filed on Feb. 22, 2018.

(30) Foreign Application Priority Data

Mar. 1, 2017 (JP) .................. 2017-038586
Mar. 14, 2017 (JP) .................. 2017-048361

(51) Int. Cl.
*H02M 3/335* (2006.01)
*H02M 1/088* (2006.01)

(52) U.S. Cl.
CPC ....... *H02M 3/33584* (2013.01); *H02M 1/088* (2013.01)

(58) Field of Classification Search
CPC .................... H02M 3/33584; H02M 1/088
See application file for complete search history.

(56) References Cited

U.S. PATENT DOCUMENTS

| 5,355,294 A | 10/1994 | De Doncker et al. |
| 2002/0126517 A1* | 9/2002 | Matsukawa ....... H02M 3/33569 363/69 |
| 2014/0003095 A1* | 1/2014 | Thomas ............ H02M 3/33584 363/21.04 |
| 2017/0310229 A1 | 10/2017 | Fujisaki et al. |
| 2018/0183345 A1* | 6/2018 | Itoh ................... H02M 3/33584 |

FOREIGN PATENT DOCUMENTS

| JP | 2013-027201 A | 2/2013 |
| JP | 2016-152687 A | 8/2016 |
| WO | 2012/116953 A2 | 9/2012 |
| WO | 2016/038966 A1 | 3/2016 |
| WO | 2016/125292 A1 | 8/2016 |

OTHER PUBLICATIONS

Official Communication issued in International Patent Application No. PCT/JP2018/006393, dated Apr. 24, 2018.

* cited by examiner

*Primary Examiner* — Jue Zhang
(74) *Attorney, Agent, or Firm* — Keating & Bennett, LLP

(57) ABSTRACT

A DC-DC converter includes a first full-bridge circuit and a second full-bridge circuit isolated by a transformer. The first full-bridge circuit includes switching elements, a first floating capacitor, and a second floating capacitor. The first full-bridge circuit operates in at least one of a full-bridge operation mode and a half-bridge operation mode. In switching of the operation mode, switching phases of the first full-bridge circuit are shifted in two portions in one cycle of a drive frequency, and shift amounts of the phases are determined such that positive and negative output voltages of the first full bridge circuit are balanced before and after the operation mode is switched.

9 Claims, 24 Drawing Sheets

FIG. 2

| | STATE | V1 | Vu | Vv | Cf1 | Cf2 | Q1 | Q2 | Q3 | Q4 | Q5 | Q6 | Q7 | Q8 |
|---|---|---|---|---|---|---|---|---|---|---|---|---|---|---|
| 0 LEVEL | (1) | 0 | Vin/2 | Vin/2 | CHARGE | CHARGE | ON | OFF | ON | OFF | OFF | ON | OFF | ON |
| | (2) | | Vin/2 | Vin/2 | CHARGE | CHARGE | OFF | ON | OFF | ON | ON | OFF | ON | OFF |
| | (3) | | Vin/2 | Vin/2 | DISCHARGE | CHARGE | OFF | ON | OFF | ON | OFF | ON | OFF | ON |
| | (4) | | Vin/2 | Vin/2 | CHARGE | DISCHARGE | ON | OFF | ON | OFF | ON | OFF | ON | OFF |
| | (5) | | Vin | Vin | UNCHANGED | UNCHANGED | ON | OFF | OFF | OFF | OFF | ON | OFF | ON |
| | (6) | | 0 | 0 | UNCHANGED | UNCHANGED | OFF | ON | OFF | OFF | ON | OFF | ON | OFF |
| FULL BRIDGE | (7) | Vin | Vin | 0 | UNCHANGED | UNCHANGED | ON | OFF | OFF | ON | ON | OFF | OFF | ON |
| | (8) | -Vin | 0 | Vin | UNCHANGED | UNCHANGED | OFF | ON | ON | OFF | OFF | ON | ON | OFF |
| HALF BRIDGE | (9) | Vin/2 | Vin/2 | 0 | UNCHANGED | CHARGE | ON | OFF | OFF | ON | OFF | ON | OFF | ON |
| | (10) | | Vin/2 | 0 | UNCHANGED | DISCHARGE | ON | OFF | OFF | ON | ON | OFF | OFF | ON |
| | (11) | | Vin/2 | 0 | CHARGE | UNCHANGED | OFF | ON | ON | OFF | OFF | ON | OFF | ON |
| | (12) | | Vin/2 | 0 | DISCHARGE | UNCHANGED | OFF | ON | ON | OFF | ON | OFF | OFF | ON |
| | (13) | -Vin/2 | 0 | Vin/2 | UNCHANGED | CHARGE | OFF | ON | ON | OFF | ON | OFF | ON | OFF |
| | (14) | | 0 | Vin/2 | UNCHANGED | DISCHARGE | OFF | ON | ON | OFF | OFF | ON | ON | OFF |
| | (15) | | 0 | Vin/2 | CHARGE | UNCHANGED | OFF | ON | OFF | ON | ON | OFF | OFF | ON |
| | (16) | | 0 | Vin/2 | DISCHARGE | UNCHANGED | ON | OFF | ON | OFF | ON | OFF | OFF | ON |

STATE (7)

STATE (8)

STATE (1)

STATE (2)

STATE (3)

STATE (4)

STATE (5)

STATE (6)

STATE (11)

STATE (12)

STATE (9)

STATE (10)

FIG. 6A
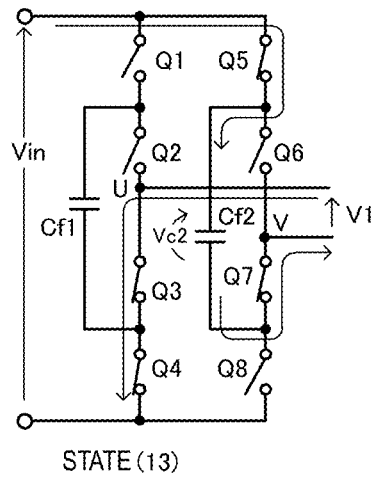
STATE (13)
FIG. 6B
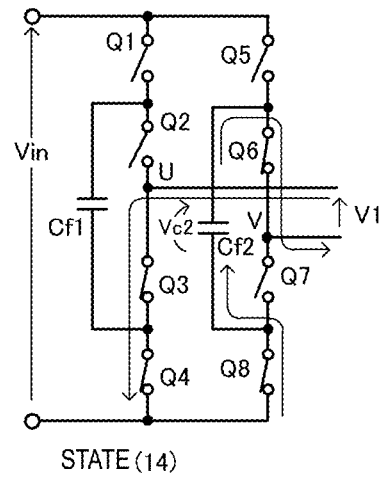
STATE (14)
FIG. 6C
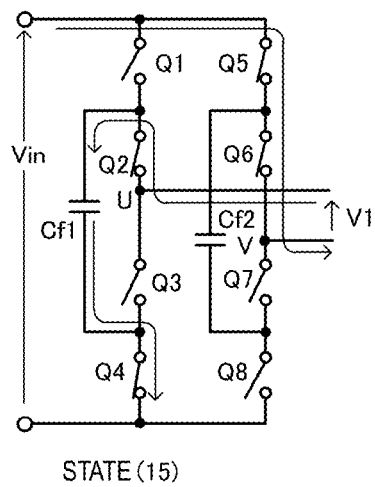
STATE (15)
FIG. 6D
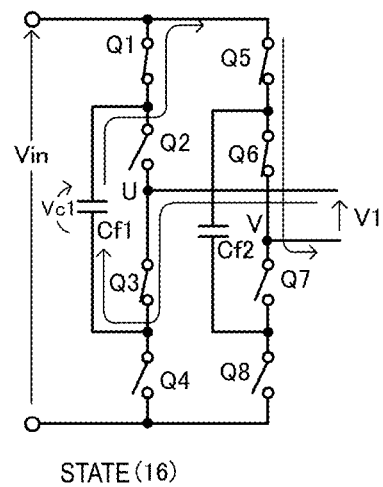
STATE (16)
FIG. 7
|   | A   | B   |
|---|-----|-----|
| 1 | (7) | (8) |

FIG. 8

|    | A    | B    |
|----|------|------|
| 1  | (9)  | (14) |
| 2  | (9)  | (16) |
| 3  | (10) | (13) |
| 4  | (10) | (14) |
| 5  | (10) | (15) |
| 6  | (10) | (16) |
| 7  | (11) | (14) |
| 8  | (11) | (16) |
| 9  | (12) | (13) |
| 10 | (12) | (14) |
| 11 | (12) | (15) |
| 12 | (12) | (16) |

FIG. 9

|    | A       | B    | C   | D    | E       | F    | G   | H    | I       |
|----|---------|------|-----|------|---------|------|-----|------|---------|
| 1  | (1)or(2)| (10) | (7) | (9)  | (5)or(6)| (14) | (8) | (13) | (5)or(6)|
| 2  | (1)or(2)| (10) | (7) | (9)  | (5)or(6)| (14) | (8) | (16) | (1)or(2)|
| 3  | (1)or(2)| (10) | (7) | (9)  | (5)or(6)| (14) | (8) | (16) | (5)or(6)|
| 4  | (1)or(2)| (10) | (7) | (9)  | (5)or(6)| (16) | (8) | (14) | (1)or(2)|
| 5  | (1)or(2)| (10) | (7) | (9)  | (5)or(6)| (16) | (8) | (14) | (5)or(6)|
| 6  | (1)or(2)| (10) | (7) | (9)  | (5)or(6)| (16) | (8) | (15) | (5)or(6)|
| 7  | (1)or(2)| (10) | (7) | (12) | (1)or(2)| (14) | (8) | (13) | (5)or(6)|
| 8  | (1)or(2)| (10) | (7) | (12) | (1)or(2)| (14) | (8) | (16) | (1)or(2)|
| 9  | (1)or(2)| (10) | (7) | (12) | (1)or(2)| (14) | (8) | (16) | (5)or(6)|
| 10 | (1)or(2)| (10) | (7) | (12) | (1)or(2)| (16) | (8) | (14) | (1)or(2)|
| 11 | (1)or(2)| (10) | (7) | (12) | (1)or(2)| (16) | (8) | (14) | (5)or(6)|
| 12 | (1)or(2)| (10) | (7) | (12) | (1)or(2)| (16) | (8) | (15) | (5)or(6)|
| 13 | (1)or(2)| (10) | (7) | (12) | (5)or(6)| (13) | (8) | (14) | (5)or(6)|
| 14 | (1)or(2)| (10) | (7) | (12) | (5)or(6)| (13) | (8) | (14) | (1)or(2)|
| 15 | (1)or(2)| (10) | (7) | (12) | (5)or(6)| (13) | (8) | (15) | (5)or(6)|
| 16 | (1)or(2)| (10) | (7) | (12) | (5)or(6)| (15) | (8) | (16) | (1)or(2)|
| 17 | (1)or(2)| (10) | (7) | (12) | (5)or(6)| (15) | (8) | (16) | (5)or(6)|
| 18 | (1)or(2)| (10) | (7) | (12) | (5)or(6)| (15) | (8) | (13) | (5)or(6)|
| 19 | (1)or(2)| (12) | (7) | (11) | (5)or(6)| (14) | (8) | (13) | (5)or(6)|
| 20 | (1)or(2)| (12) | (7) | (11) | (5)or(6)| (14) | (8) | (16) | (1)or(2)|
| 21 | (1)or(2)| (12) | (7) | (11) | (5)or(6)| (14) | (8) | (16) | (5)or(6)|
| 22 | (1)or(2)| (12) | (7) | (11) | (5)or(6)| (16) | (8) | (14) | (1)or(2)|
| 23 | (1)or(2)| (12) | (7) | (11) | (5)or(6)| (16) | (8) | (14) | (5)or(6)|
| 24 | (1)or(2)| (12) | (7) | (11) | (5)or(6)| (16) | (8) | (15) | (5)or(6)|
| 25 | (1)or(2)| (12) | (7) | (10) | (1)or(2)| (14) | (8) | (13) | (5)or(6)|
| 26 | (1)or(2)| (12) | (7) | (10) | (1)or(2)| (14) | (8) | (16) | (1)or(2)|
| 27 | (1)or(2)| (12) | (7) | (10) | (1)or(2)| (14) | (8) | (16) | (5)or(6)|
| 28 | (1)or(2)| (12) | (7) | (10) | (1)or(2)| (16) | (8) | (14) | (1)or(2)|
| 29 | (1)or(2)| (12) | (7) | (10) | (1)or(2)| (16) | (8) | (14) | (5)or(6)|
| 30 | (1)or(2)| (12) | (7) | (10) | (1)or(2)| (16) | (8) | (15) | (5)or(6)|
| 31 | (1)or(2)| (12) | (7) | (10) | (5)or(6)| (13) | (8) | (14) | (5)or(6)|
| 32 | (1)or(2)| (12) | (7) | (10) | (5)or(6)| (13) | (8) | (14) | (1)or(2)|
| 33 | (1)or(2)| (12) | (7) | (10) | (5)or(6)| (13) | (8) | (15) | (5)or(6)|
| 34 | (1)or(2)| (12) | (7) | (10) | (5)or(6)| (15) | (8) | (13) | (5)or(6)|
| 35 | (1)or(2)| (12) | (7) | (10) | (5)or(6)| (15) | (8) | (16) | (1)or(2)|
| 36 | (1)or(2)| (12) | (7) | (10) | (5)or(6)| (15) | (8) | (16) | (5)or(6)|

FIG. 10

| | A | B | C | D | E | F | G | H | I |
|---|---|---|---|---|---|---|---|---|---|
| 37 | (5)or(6) | (9) | (7) | (11) | (5)or(6) | (14) | (8) | (13) | (5)or(6) |
| 38 | (5)or(6) | (9) | (7) | (11) | (5)or(6) | (14) | (8) | (16) | (1)or(2) |
| 39 | (5)or(6) | (9) | (7) | (11) | (5)or(6) | (14) | (8) | (16) | (5)or(6) |
| 40 | (5)or(6) | (9) | (7) | (11) | (5)or(6) | (16) | (8) | (14) | (1)or(2) |
| 41 | (5)or(6) | (9) | (7) | (11) | (5)or(6) | (16) | (8) | (14) | (5)or(6) |
| 42 | (5)or(6) | (9) | (7) | (11) | (5)or(6) | (16) | (8) | (15) | (5)or(6) |
| 43 | (5)or(6) | (9) | (7) | (10) | (1)or(2) | (14) | (8) | (13) | (5)or(6) |
| 44 | (5)or(6) | (9) | (7) | (10) | (1)or(2) | (14) | (8) | (16) | (1)or(2) |
| 45 | (5)or(6) | (9) | (7) | (10) | (1)or(2) | (14) | (8) | (16) | (5)or(6) |
| 46 | (5)or(6) | (9) | (7) | (10) | (1)or(2) | (16) | (8) | (14) | (1)or(2) |
| 47 | (5)or(6) | (9) | (7) | (10) | (1)or(2) | (16) | (8) | (14) | (5)or(6) |
| 48 | (5)or(6) | (9) | (7) | (10) | (1)or(2) | (16) | (8) | (15) | (5)or(6) |
| 49 | (5)or(6) | (9) | (7) | (10) | (5)or(6) | (13) | (8) | (14) | (5)or(6) |
| 50 | (5)or(6) | (9) | (7) | (10) | (5)or(6) | (13) | (8) | (14) | (1)or(2) |
| 51 | (5)or(6) | (9) | (7) | (10) | (5)or(6) | (13) | (8) | (15) | (5)or(6) |
| 52 | (5)or(6) | (9) | (7) | (10) | (5)or(6) | (15) | (8) | (13) | (5)or(6) |
| 53 | (5)or(6) | (9) | (7) | (10) | (5)or(6) | (15) | (8) | (16) | (1)or(2) |
| 54 | (5)or(6) | (9) | (7) | (10) | (5)or(6) | (15) | (8) | (16) | (5)or(6) |
| 55 | (5)or(6) | (11) | (7) | (9) | (5)or(6) | (14) | (8) | (13) | (5)or(6) |
| 56 | (5)or(6) | (11) | (7) | (9) | (5)or(6) | (14) | (8) | (16) | (1)or(2) |
| 57 | (5)or(6) | (11) | (7) | (9) | (5)or(6) | (14) | (8) | (16) | (5)or(6) |
| 58 | (5)or(6) | (11) | (7) | (9) | (5)or(6) | (16) | (8) | (14) | (1)or(2) |
| 59 | (5)or(6) | (11) | (7) | (9) | (5)or(6) | (16) | (8) | (14) | (5)or(6) |
| 60 | (5)or(6) | (11) | (7) | (9) | (5)or(6) | (16) | (8) | (15) | (5)or(6) |
| 61 | (5)or(6) | (11) | (7) | (12) | (1)or(2) | (14) | (8) | (13) | (5)or(6) |
| 62 | (5)or(6) | (11) | (7) | (12) | (1)or(2) | (14) | (8) | (14) | (1)or(2) |
| 63 | (5)or(6) | (11) | (7) | (12) | (1)or(2) | (14) | (8) | (16) | (5)or(6) |
| 64 | (5)or(6) | (11) | (7) | (12) | (1)or(2) | (16) | (8) | (16) | (1)or(2) |
| 65 | (5)or(6) | (11) | (7) | (12) | (1)or(2) | (16) | (8) | (14) | (5)or(6) |
| 66 | (5)or(6) | (11) | (7) | (12) | (1)or(2) | (16) | (8) | (15) | (5)or(6) |
| 67 | (5)or(6) | (11) | (7) | (12) | (5)or(6) | (13) | (8) | (14) | (5)or(6) |
| 68 | (5)or(6) | (11) | (7) | (12) | (5)or(6) | (13) | (8) | (14) | (1)or(2) |
| 69 | (5)or(6) | (11) | (7) | (12) | (5)or(6) | (13) | (8) | (15) | (5)or(6) |
| 70 | (5)or(6) | (11) | (7) | (12) | (5)or(6) | (15) | (8) | (13) | (5)or(6) |
| 71 | (5)or(6) | (11) | (7) | (12) | (5)or(6) | (15) | (8) | (16) | (1)or(2) |
| 72 | (5)or(6) | (11) | (7) | (12) | (5)or(6) | (15) | (8) | (16) | (5)or(6) |

FIG. 11

|     | A   | B    | C   | D    | E   | F    | G   | H    | I   |
|-----|-----|------|-----|------|-----|------|-----|------|-----|
| 73  | (3) | (10) | (7) | (9)  | (4) | (13) | (8) | (14) | (3) |
| 74  | (3) | (10) | (7) | (9)  | (4) | (13) | (8) | (16) | (4) |
| 75  | (3) | (10) | (7) | (9)  | (4) | (16) | (8) | (13) | (4) |
| 76  | (3) | (10) | (7) | (9)  | (4) | (16) | (8) | (15) | (3) |
| 77  | (3) | (10) | (7) | (11) | (3) | (14) | (8) | (13) | (4) |
| 78  | (3) | (10) | (7) | (11) | (3) | (14) | (8) | (15) | (3) |
| 79  | (3) | (10) | (7) | (11) | (3) | (15) | (8) | (14) | (3) |
| 80  | (3) | (10) | (7) | (11) | (3) | (15) | (8) | (16) | (4) |
| 81  | (3) | (11) | (7) | (10) | (3) | (14) | (8) | (13) | (4) |
| 82  | (3) | (11) | (7) | (10) | (3) | (14) | (8) | (15) | (3) |
| 83  | (3) | (11) | (7) | (10) | (3) | (15) | (8) | (14) | (3) |
| 84  | (3) | (11) | (7) | (10) | (3) | (15) | (8) | (16) | (4) |
| 85  | (3) | (11) | (7) | (12) | (4) | (13) | (8) | (14) | (3) |
| 86  | (3) | (11) | (7) | (12) | (4) | (13) | (8) | (16) | (4) |
| 87  | (3) | (11) | (7) | (12) | (4) | (16) | (8) | (13) | (4) |
| 88  | (3) | (11) | (7) | (12) | (4) | (16) | (8) | (15) | (3) |
| 89  | (4) | (9)  | (7) | (10) | (3) | (14) | (8) | (13) | (4) |
| 90  | (4) | (9)  | (7) | (10) | (3) | (14) | (8) | (15) | (3) |
| 91  | (4) | (9)  | (7) | (10) | (3) | (15) | (8) | (14) | (3) |
| 92  | (4) | (9)  | (7) | (10) | (3) | (15) | (8) | (16) | (4) |
| 93  | (4) | (9)  | (7) | (12) | (4) | (13) | (8) | (14) | (3) |
| 94  | (4) | (9)  | (7) | (12) | (4) | (13) | (8) | (16) | (4) |
| 95  | (4) | (9)  | (7) | (12) | (4) | (16) | (8) | (13) | (4) |
| 96  | (4) | (9)  | (7) | (12) | (4) | (16) | (8) | (15) | (3) |
| 97  | (4) | (12) | (7) | (9)  | (4) | (13) | (8) | (14) | (3) |
| 98  | (4) | (12) | (7) | (9)  | (4) | (13) | (8) | (16) | (4) |
| 99  | (4) | (12) | (7) | (9)  | (4) | (16) | (8) | (13) | (4) |
| 100 | (4) | (12) | (7) | (9)  | (4) | (16) | (8) | (15) | (3) |
| 101 | (4) | (12) | (7) | (11) | (3) | (14) | (8) | (13) | (4) |
| 102 | (4) | (12) | (7) | (11) | (3) | (14) | (8) | (15) | (3) |
| 103 | (4) | (12) | (7) | (11) | (3) | (15) | (8) | (14) | (3) |
| 104 | (4) | (12) | (7) | (11) | (3) | (15) | (8) | (16) | (4) |

FIG. 12
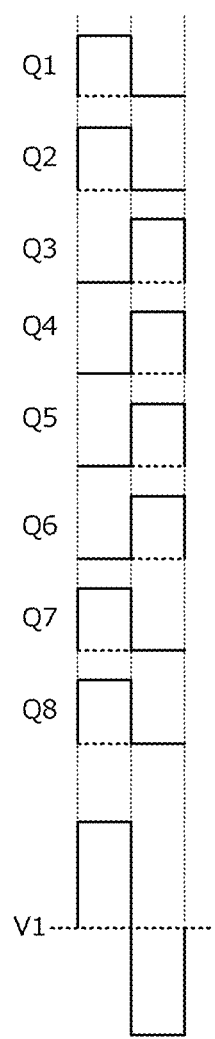
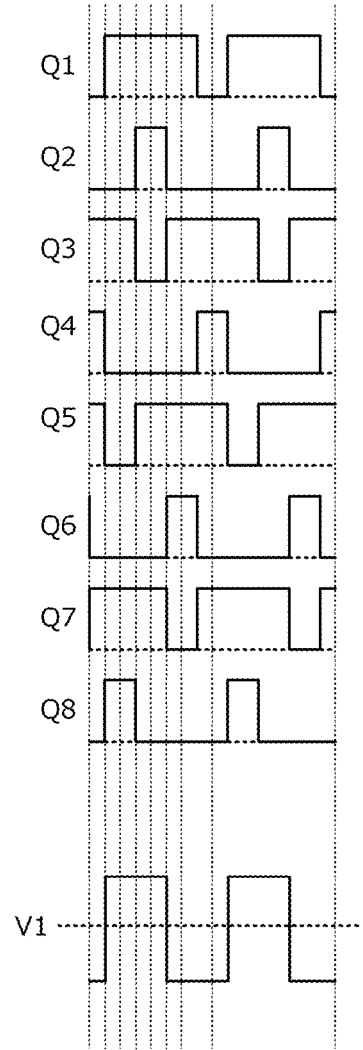
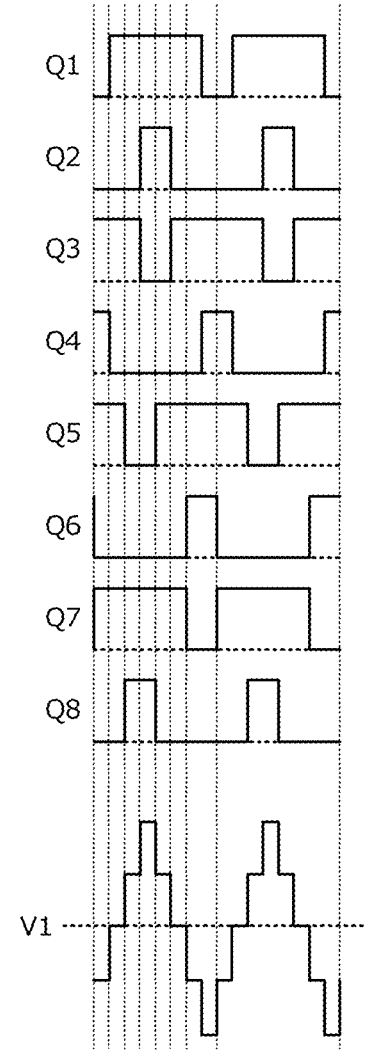
FULL BRIDGE            HALF BRIDGE            FIVE-LEVEL

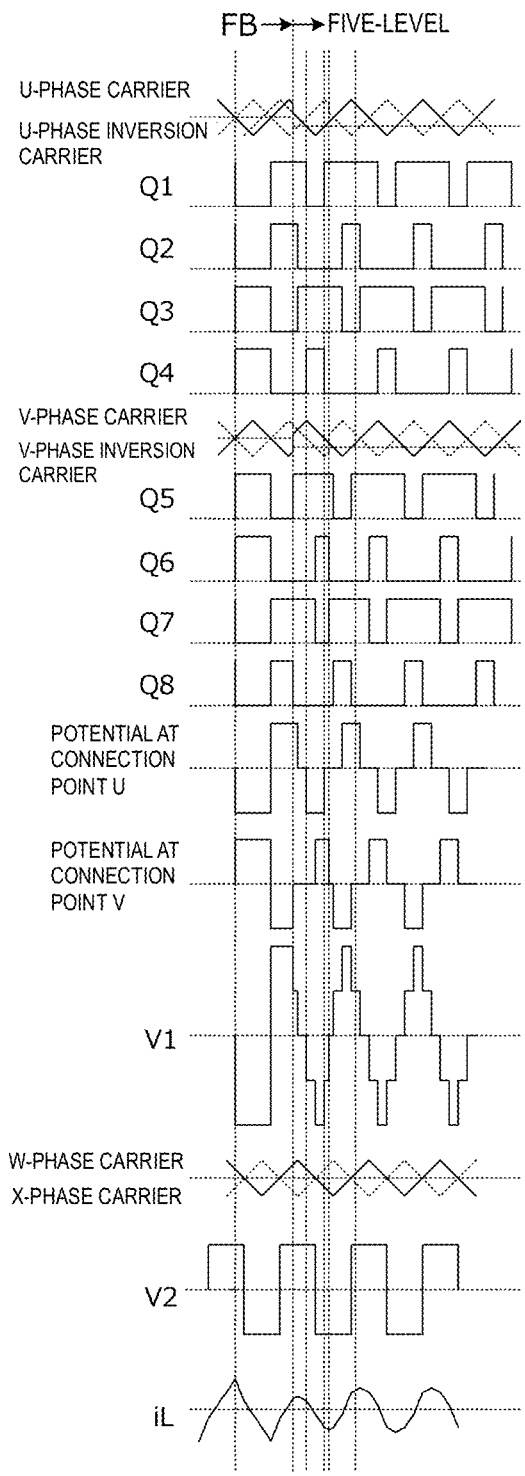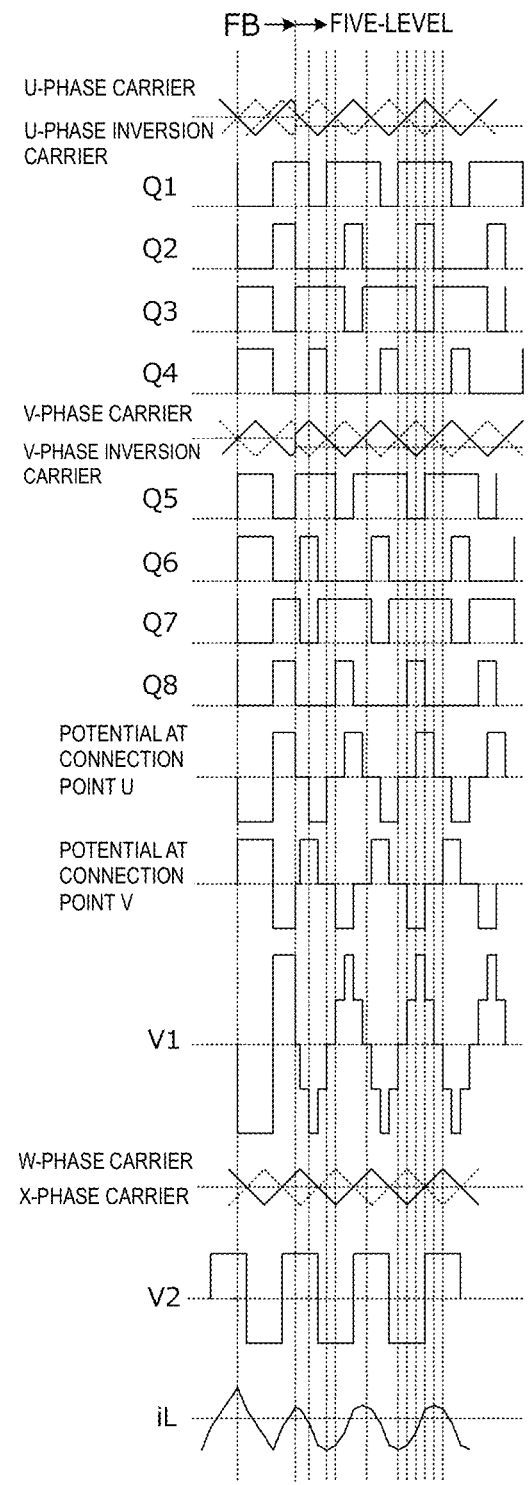

FIG. 25A
FIG. 25B
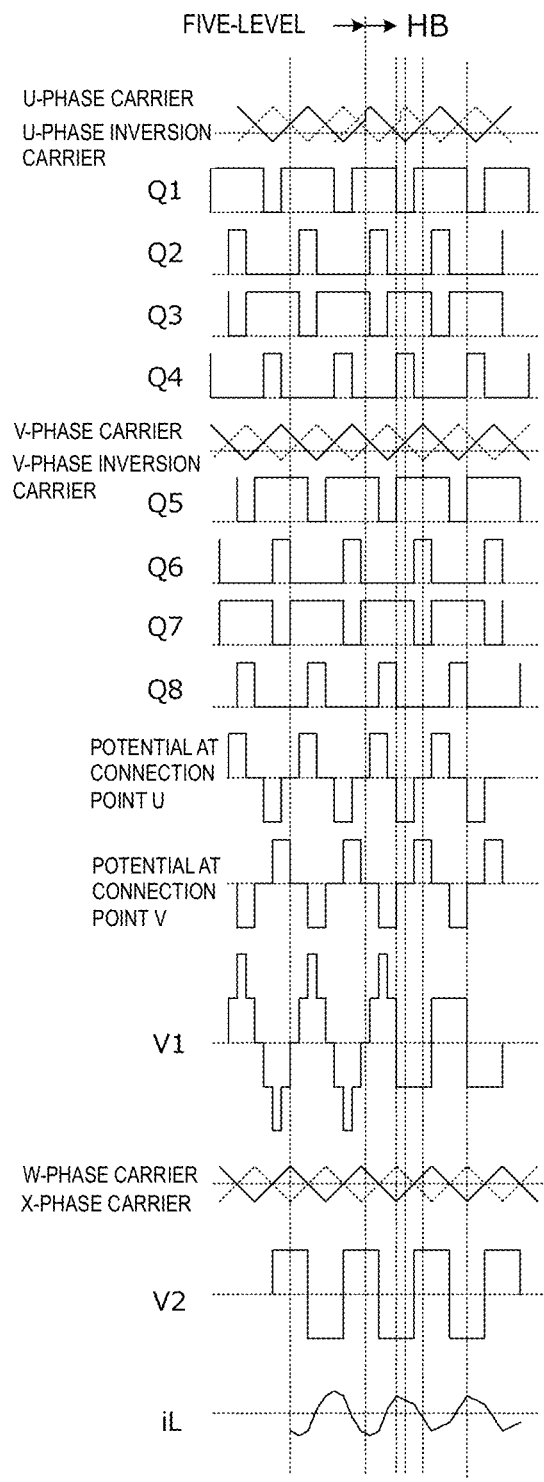
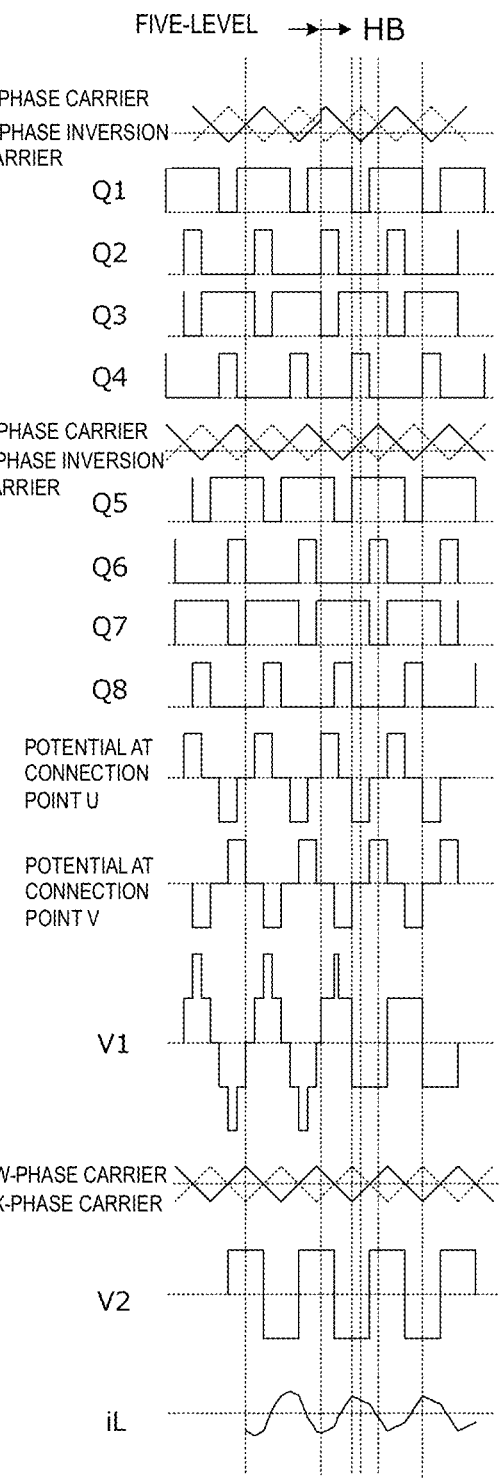

DC-DC CONVERTER

CROSS REFERENCE TO RELATED APPLICATIONS

This application claims the benefit of priority to Japanese Patent Application No. 2017-038586 filed on Mar. 1, 2017 and Japanese Patent Application No. 2017-048361 filed on Mar. 14, 2017, and is a Continuation Application of PCT Application No. PCT/JP2018/006393 filed on Feb. 22, 2018. The entire contents of each application are hereby incorporated herein by reference.

BACKGROUND OF THE INVENTION

1. Field of the Invention

The present invention relates to a dual active bridge (DAB) DC-DC converter.

2. Description of the Related Art

U.S. Pat. No. 5,355,294 discloses a DAB converter. In the converter described in U.S. Pat. No. 5,355,294, a full-bridge circuit is connected to each of a primary winding and a secondary winding of a transformer, and a switching phase difference between the two full-bridge circuits is appropriately controlled to perform power transmission.

In the converter described in U.S. Pat. No. 5,355,294, switching loss is reduced by performing zero voltage switching (ZVS) by utilizing leakage inductance of the transformer and parasitic capacitance of a semiconductor device. However, a ZVS range is limited and a reactive current is increased in proportion to a difference between an input/output voltage ratio and a transformer winding number ratio, which may lead to reduced efficiency. In particular, for example, when the input/output voltage ratio is large and a light load is connected to an output terminal, the reactive current which does not contribute to transmission power is increased to possibly cause deterioration in efficiency.

In the DAB DC-DC converter, a direct current (DC) component may be superimposed on an inductor current and an excitation current of the transformer due to transient change in supplied electric power (DC offset). For example, when the transmission power abruptly changes or when an operation mode is switched, the DC offset is generated. In order to prevent the inductor and the transformer from being magnetically saturated even when the DC offset is generated, it is necessary to use an inductor and a transformer which have large magnetic cores, that is, large volumes. This leads to an increase in the size and the cost of a device.

SUMMARY OF THE INVENTION

Preferred embodiments of the present invention provide DC-DC converters that are each able to achieve a ZVS operation in a wide range even when an input/output voltage ratio is large and a load variation range is wide and that reduces or prevents DC offset which is generated due to a transient change in an operation state to avoid an increase in the size and the cost of a device.

A DC-DC converter according to a preferred embodiment of the invention includes a first full-bridge circuit that includes a first leg including a first high-side switch and a first low-side switch and a second leg including a second high-side switch and a second low-side switch and in which a first DC voltage is applied to the first leg and the second leg; a second full-bridge circuit that includes a third leg including a third high-side switch and a third low-side switch and a fourth leg including a fourth high-side switch and a fourth low-side switch and in which a second DC voltage is applied to the third leg and the fourth leg; a transformer that includes a primary winding connected to an input/output portion of the first full-bridge circuit and a secondary winding connected to an input/output portion of the second full-bridge circuit and that isolates the first full-bridge circuit and the second full-bridge circuit from each other; and a controller that controls the first full-bridge circuit and the second full-bridge circuit. The first high-side switch includes a first switching element connected to a high-side line and a second switching element connected in series to the first switching element. The first low-side switch includes a fourth switching element connected to a low-side line and a third switching element connected in series to the fourth switching element. The second high-side switch includes a fifth switching element connected to the high-side line and a sixth switching element connected in series to the fifth switching element. The second low-side switch includes an eighth switching element connected to the low-side line and a seventh switching element connected in series to the eighth switching element.

The first full-bridge circuit includes a first floating capacitor connected between a connection point of the first switching element and the second switching element and a connection point of the third switching element and the fourth switching element and a second floating capacitor connected between a connection point of the fifth switching element and the sixth switching element and a connection point of the seventh switching element and the eighth switching element.

An inductor connected in series between at least one of the input/output portion of the first full-bridge circuit and the primary winding, and the input/output portion of the second full-bridge circuit and the secondary winding is provided.

The controller operates each of the switching elements of the first full-bridge circuit and the second full-bridge circuit at the same drive frequency, and the controller controls any one of a full-bridge operation mode of controlling each of the switching elements of the first full-bridge circuit such that an absolute value of a peak value of a voltage of the input/output portion of the first full-bridge circuit is the first DC voltage over a half cycle of the drive frequency, a half-bridge operation mode of controlling each of the switching elements of the first full-bridge circuit such that the absolute value of the peak value of the voltage of the input/output portion of the first full-bridge circuit is half of the first DC voltage over the half cycle, and a five-level operation mode of switching each of the switching elements of the first full-bridge circuit into a state of performing a full-bridge operation and a state of performing a half-bridge operation to output voltages of five levels from the first full-bridge circuit during a period of one cycle of the drive frequency.

The controller shifts switching phases of the first high-side switch and the second low-side switch at a reference cycle timing of the drive frequency and shifts switching phases of the first low-side switch and the second high-side switch at a half-cycle timing of the reference cycle of the drive frequency in a cycle in which an operation mode is switched from one operation mode to another operation mode among the full-bridge operation mode, the half-bridge operation mode, and the five-level operation mode, and determines shift amounts of the phases such that positive and negative output voltages of the first full-bridge circuit are balanced before and after the operation mode is switched.

With the above configuration, a voltage that is output from the first full-bridge circuit is able to be made different between the case where the voltage input to the first full-bridge circuit is applied to the first and second floating capacitors and the case where the voltage is not applied to the first and second floating capacitors. That is, by operating the first full-bridge circuit in the full-bridge operation mode or the half-bridge operation mode, even when an input/output voltage ratio is large and a variation range of load connected to an output portion is wide, it is possible to reduce or prevent an increase in a reactive current which does not contribute to transmission by widening a ZVS range over the configuration of the existing technique, thus enabling the DC-DC converter to operate efficiently.

In addition, since each of the first leg and the second leg defining the first full-bridge circuit is provided by connecting the four switching elements in series, a voltage that is applied to each of the elements is lower than that in the case where two switching elements are connected in series. Therefore, it is not necessary to increase an element withstand voltage of each of the switching elements. As a result, a MOS-FET having a low on-resistance value is able to be used for each of the switching elements.

The controller switches the operation mode between the full-bridge operation mode and the half-bridge operation mode during one cycle of the drive frequency of the first full-bridge circuit, so that potentials of five levels are able to be output from the first full-bridge circuit. It is therefore possible to provide a DC-DC converter that is able to perform the ZVS operation even in a light load area and is able to operate more efficiently when the input/output voltage ratio is large and the variation range of the load connected to the output portion is large.

Moreover, since the positive and negative output voltages of the first full-bridge circuit are balanced before and after the operation mode is switched, DC offset with an inductor current and an excitation current of the transformer is reduced or prevented. As a result, a reduction in the size and the cost of the device is able to be achieved.

It is preferable that the controller determine switching phases of the switching elements of the first full-bridge circuit based on a U-phase carrier and a U-phase inversion carrier which define the switching phase of the first high-side switch or the first low-side switch, and a V-phase carrier and a V-phase inversion carrier which define the switching phase of the second high-side switch or the second low-side switch, shift phases of the U-phase carrier and the V-phase inversion carrier at the reference cycle timing of the drive frequency, and shift phases of the U-phase inversion carrier and the V-phase carrier at the half-cycle timing of the reference cycle of the drive frequency.

With the above configuration, compared to the case where a phase difference between the first full-bridge circuit and the second full-bridge circuit is changed at one time, the DC offset when the operation mode is switched is able to be reduced or prevented.

It is preferable that the U-phase carrier, the U-phase inversion carrier, the V-phase carrier, and the V-phase inversion carrier are count values of a reference clock, the controller controls the first full-bridge circuit and the second full-bridge circuit based on comparison between the count values and reference values, and shift amounts of the phases are determined by changes in the count values.

With the above configuration, it is possible to simplify the configuration to control the phase shift and to set the shift amounts of the phases.

The U-phase carrier, the U-phase inversion carrier, the V-phase carrier, and the V-phase inversion carrier may be count values of a reference clock, the controller may control the first full-bridge circuit and the second full-bridge circuit based on a comparison between the count values and reference values, and shift amounts of the phases may be determined by changes in the reference values.

With the above configuration, it is possible to simplify the configuration to control the phase shift and to set the shift amounts of the phases.

Preferred embodiments of the present invention provide small-sized and low-cost DC-DC converters that are each able to widen the ZVS operation range by switching the operation mode even when the input/output voltage ratio is large and the variation of the load connected to the output portion is wide and reduce or prevent the DC offset which is generated in switching of the operation mode.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a table showing, for operation modes, relationships between states of eight switching elements of a full-bridge circuit 10 and voltages Vu, Vv, and V1 and relative relationships between charge and discharge states of a first floating capacitor Cf1 and a second floating capacitor Cf2.

FIGS. 6A to 6D are diagrams illustrating a path of a current flowing through the full-bridge circuit 10 in each of states illustrated in FIG. 2.

FIG. 7 is a table showing a combination from 16 states illustrated in FIG. 2 with which a full-bridge operation mode is performed.

FIG. 8 is a table showing combinations from the 16 states illustrated in FIG. 2 with which a half-bridge operation mode is performed.

FIG. 9 is a table showing some combinations from the 16 states illustrated in FIG. 2 with which a five-level operation mode is performed.

FIG. 10 is a table showing some combinations from the 16 states illustrated in FIG. 2 with which a five-level operation mode is performed.

FIG. 11 is a table showing some combinations from the 16 states illustrated in FIG. 2 with which a five-level operation mode is performed.

FIG. 12 is a waveform chart illustrating ON/OFF states of switching elements Q1 to Q8 in the full-bridge operation mode, the half-bridge operation mode, and the five-level operation mode.

FIG. 22A illustrates waveform charts of each of the portions when the operation mode is switched from the full-bridge operation mode to the five-level operation mode in the DC-DC converter in a preferred embodiment of the present invention. FIG. 22B illustrates waveform charts thereof in the comparative example.

FIG. 25A illustrates waveform charts of each of the portions when the operation mode is switched from the five-level operation mode to the half-bridge operation mode in the DC-DC converter in a preferred embodiment of the present invention. FIG. 25B illustrates waveform charts thereof in the comparative example.

FIG. 27 is a waveform chart illustrating changes in each of the carriers and reference values as comparison targets thereof, and the like.

DETAILED DESCRIPTION OF THE PREFERRED EMBODIMENTS

Preferred embodiments of the present invention will be described in detail below with reference to the accompanying drawings.

A DC-DC converter, which will be described below, is an isolated bidirectional DC-DC converter in which two full-bridge circuits are isolated from each other by a transformer and power is bidirectionally transmitted between the two full-bridge circuits.

Figure 1:
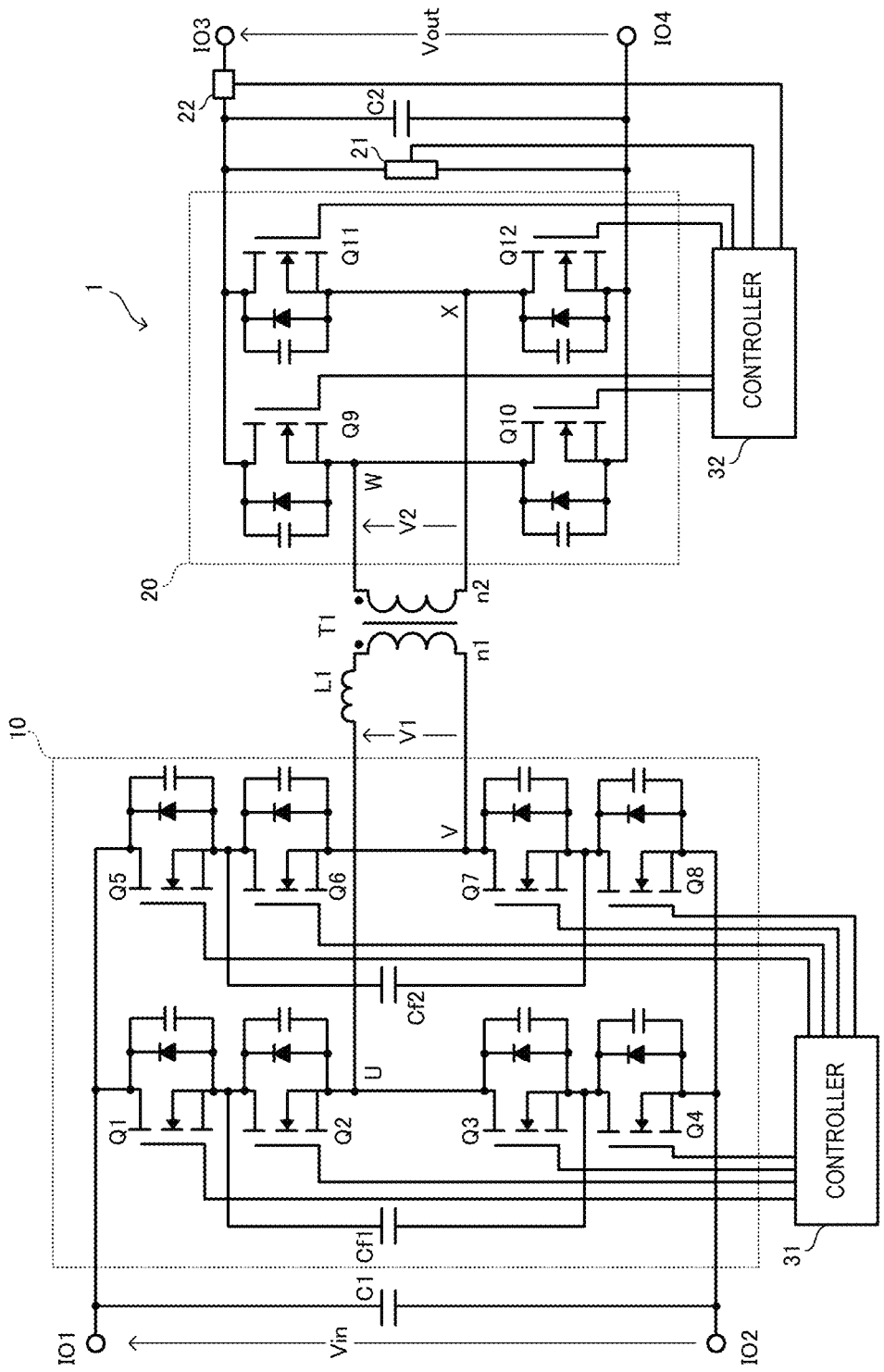
FIG. 1 is a circuit diagram of a DC-DC converter 1 according to a preferred embodiment of the present invention.

FIG. 1 is a circuit diagram of a DC-DC converter 1 according to a preferred embodiment of the present invention.

The DC-DC converter 1 includes input/output terminals IO1, IO2, IO3, and IO4. The input/output terminals IO1, IO2, IO3, and IO4 are connected to loads and DC power supplies. The DC-DC converter 1 is a bidirectional DC-DC converter that transforms a DC voltage input from ones of the input/output terminals IO1 and IO2 and the input/output terminals IO3 and IO4 and outputs the converted DC voltage to the others thereof.

The input/output terminals IO1 and IO2 are connected to an input capacitor C1 and a full-bridge circuit 10. The full-bridge circuit 10 includes connecting, in parallel, a first series circuit (first leg) including a first switching element Q1, a second switching element Q2, a third switching element Q3, and a fourth switching element Q4 and a second series circuit (second leg) including a fifth switching element Q5, a sixth switching element Q6, a seventh switching element Q7, and an eighth switching element Q8.

The first switching element Q1 connected to a high-side line and the second switching element Q2 connected in series to the first switching element Q1 define a first high-side switch. The fourth switching element Q4 connected to a low-side line and the third switching element Q3 connected in series to the fourth switching element Q4 define a first low-side switch. The fifth switching element Q5 connected to the high-side line and the sixth switching element Q6 connected in series to the fifth switching element Q5 define a second high-side switch. The eighth switching element Q8 connected to the low-side line and the seventh switching element Q7 connected in series to the eighth switching element Q8 define a second low-side switch.

The first to eighth switching elements Q1 to Q8 are preferably, for example, n-type MOS-FETs, and body diodes and parasitic capacitances are provided therein. Further, gates of the first to eighth switching elements Q1 to Q8 are connected to a controller 31, and gate voltages are applied thereto from the controller 31 to provide switching control. In the following description, the first to eighth switching elements Q1 to Q8 are simply referred to as switching elements Q1 to Q8.

An existing full-bridge circuit includes connecting, in parallel, series circuits in which two switching elements are connected in series. By contrast, in the present preferred embodiment, since each of the first series circuit and the second series circuit which define the full-bridge circuit 10 is provided by connecting the four switching elements in series, a voltage which is applied to each element is lower than that in the configuration in which the two switching elements are connected in series. Therefore, it is not necessary to increase an element withstand voltage of each of the switching elements. Since a switching element having a high withstand voltage generally has a large on-resistance value, a MOS-FET having a low on-resistance value is able to be used for each switching element.

The full-bridge circuit 10 includes a first floating capacitor Cf1 and a second floating capacitor Cf2. The first floating capacitor Cf1 is connected between a connection point of the first switching element Q1 and the second switching element Q2 and a connection point of the third switching element Q3 and the fourth switching element Q4. The second floating capacitor Cf2 is connected between a connection point of the fifth switching element Q5 and the sixth switching element Q6 and a connection point of the seventh switching element Q7 and the eighth switching element Q8.

The full-bridge circuit 10 corresponds to a "first full-bridge circuit". The first floating capacitor corresponds to a "first floating capacitor", and the second floating capacitor corresponds to a "second floating capacitor".

The input/output terminals IO3 and IO4 are connected to an input capacitor C2 and a full-bridge circuit 20. The full-bridge circuit 20 includes connecting, in parallel, a series circuit (third leg) of a ninth switching element Q9 and a tenth switching element Q10 connected in series and a series circuit (fourth leg) of an eleventh switching element Q11 and a twelfth switching element Q12 connected in series. The ninth to twelfth switching elements Q9 to Q12 are preferably n-type MOS-FETs, for example, and body diodes and parasitic capacitances are provided therein. Gates of the ninth to twelfth switching elements Q9 to Q12 are connected to a controller 32, and gate signals are applied thereto from the controller 32 for switching control. The full-bridge circuit 20 corresponds to a "second full-bridge circuit".

Further, the input/output terminals IO3 and IO4 are provided with an output voltage detection circuit 21 and a load current detection circuit 22.

A transformer T1 is connected between the full-bridge circuit 10 and the full-bridge circuit 20. The transformer T1 includes a primary winding n1 and a secondary winding n2. One end of the primary winding n1 is connected to a connection point U of the second switching element Q2 and the third switching element Q3 with an inductor L1 interposed therebetween and the other end thereof is connected to a connection point V of the sixth switching element Q6 and the seventh switching element Q7. One end of the secondary winding n2 is connected to a connection point W of the ninth switching element Q9 and the tenth switching element Q10, and the other end thereof is connected to a connection point X of the eleventh switching element Q11 and the twelfth switching element Q12. In the present preferred embodiment, the winding number ratio of the primary winding n1 and the secondary winding n2 is set to be N:1.

In the DC-DC converter 1 configured as described above, the controller 31 controls the full-bridge circuit 10 by zero voltage switching by utilizing resonance between the parasitic capacitances of the switching elements Q1 to Q8 and the inductor (resonance coil) L1. That is to say, during a dead time period in ON/OFF switching of the switching elements, a current flowing through the inductor L1 is caused to flow through the parasitic capacitances of the switching elements to discharge the parasitic capacitances, and the switching elements are turned ON at zero voltage. Switching loss, switching noise, and the like is therefore able to be reduced. Note that the inductor L1 may be provided on the secondary side of the transformer T1. The zero voltage switching may be performed by utilizing resonance between leakage inductance of the transformer T1 and the parasitic capacitances of the switching elements Q1 to Q8, instead of using the inductor L1.

A DC voltage Vin is applied to the input/output terminals IO1 and IO2 of the DC-DC converter 1 configured as described above. The controller 31 performs switching control on each of the switching elements Q1 to Q8 of the full-bridge circuit 10. A voltage V1 of five levels of 0, ±Vin/2, and ±Vin is applied to the primary winding n1 of the transformer T1. When the voltage V1 is applied to the primary winding n1, a voltage is induced in the secondary winding n2. The controller 32 performs switching control on the full-bridge circuit 20 and outputs a DC voltage Vout of 0, Vin/2N, or Vin/N from the input/output terminals IO3 and IO4. That is, the full-bridge circuit 10 is a five-level circuit that outputs five voltage levels. The full-bridge circuit 20 is a three-level circuit that outputs three voltage levels.

Since the DC-DC converter 1 is the bidirectional DC-DC converter, when a DC voltage is input from the input/output terminals IO3 and IO4, the DC-DC converter 1 performs switching control on the full-bridge circuits 10 and 20 to output a DC voltage from the input/output terminals IO1 and IO2.

FIG. 2 is a table showing, for operation modes, relationships between states of the eight switching elements of the full-bridge circuit 10 and voltages Vu, Vv, and V1 and relative relationships between charge and discharge states of the first floating capacitor Cf1 and the second floating capacitor Cf2. The voltage Vu is a voltage at the connection point U of the switching elements Q2 and Q3. The voltage Vv is a voltage at the connection point V of the switching elements Q6 and Q7. The voltage V1 is an output voltage from the full-bridge circuit 10, which is applied to the primary winding n1 of the transformer T1, and is potential difference between the connection point U and the connection point V. FIGS. 3A to 3D, FIGS. 4A to 4D, FIGS. 5A to 5D, and FIGS. 6A to 6D are diagrams illustrating a path of a current flowing through the full-bridge circuit 10 in each of the states illustrated in FIG. 2.

The full-bridge circuit 10 according to the present preferred embodiment operates in any one of a full-bridge operation mode, a half-bridge operation mode, and a five-level operation mode. The full-bridge operation mode is an operation mode in which the voltage V1 is ±Vin. In the full-bridge mode, a current path passes through neither of the first floating capacitor nor the second floating capacitor. The half-bridge operation mode is an operation mode in which the voltage V1 is ±Vin/2. In the half-bridge operation mode, a current path passes through only one of the first floating capacitor and the second floating capacitor. The five-level operation mode is an operation mode in which the full-bridge operation mode and the half-bridge operation mode are combined to obtain the voltage V1 of 0, ±Vin/2, and ±Vin.

(V1=Vin)

Figure 3A:
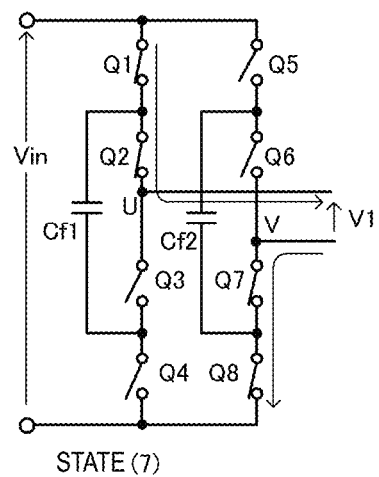
FIGS. 3A to 3D are diagrams illustrating a path of a current flowing through the full-bridge circuit 10 in each of states illustrated in FIG. 2.

When the switching elements Q1, Q2, Q7, and Q8 are in the ON states and the switching elements Q3, Q4, Q5, and Q6 are in the OFF states, a current flows through the path illustrated in FIG. 3A. In this case, the output voltage V1 is Vin. In this case, the voltage Vu is Vin, the voltage Vv is 0, and the voltage V1 is Vu−Vv, that is, Vin.

(V1=−Vin)

Figure 3B:
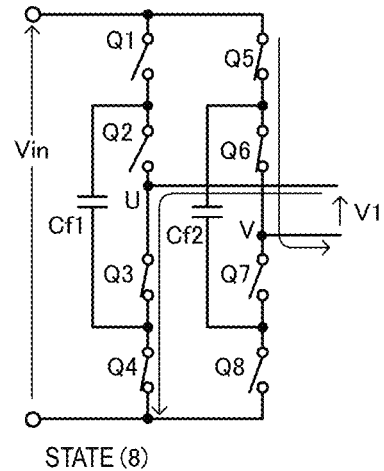

When the switching elements Q3, Q4, Q5, and Q6 are in the ON states and the switching elements Q1, Q2, Q7, and Q8 are in the OFF states, a current flows through the path illustrated in FIG. 3B. In this case, a voltage having a polarity opposite to that in FIG. 3A is applied to the primary winding n1 of the transformer T1, and the voltage Vu is 0, the voltage Vv is Vin, and the voltage V1 is Vu−Vv, that is, −Vin.

(V1=0)

Figure 3C:
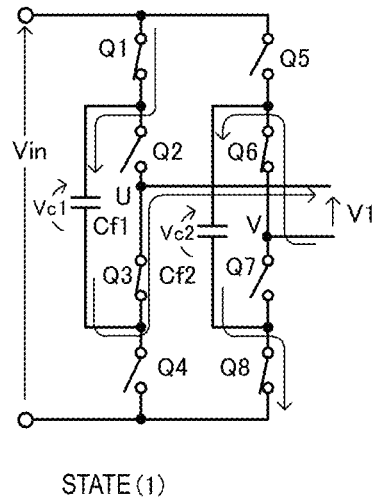

When the switching elements Q1, Q3, and Q6, Q8 are in the ON states and the switching elements Q2, Q4, Q5, and Q7 are in the OFF states, a current flows through the path illustrated in FIG. 3C. In this case, the voltage Vu is Vin−Vc1. Vc1 is a charging voltage of the first floating capacitor Cf1. If Vc1 is Vin/2, the voltage Vu is Vin/2. Further, the voltage Vv is Vc2. Vc2 is a charging voltage of the second floating capacitor Cf2. If Vc2 is Vin/2, the voltage Vu is Vin/2. The voltage V1 is Vu−Vv, that is, 0.

Figure 3D:
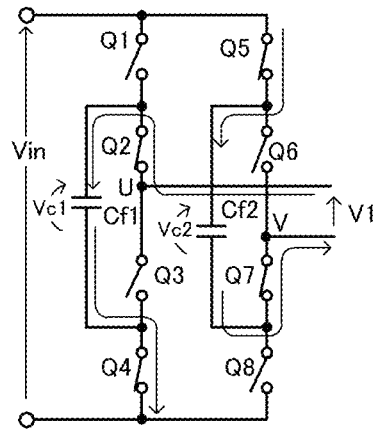

When the switching elements Q2, Q4, Q5, and Q7 are in the ON states and the switching elements Q1, Q3, Q6, and Q8 are in the OFF states, a current flows through the path illustrated in FIG. 3D. In this case, the voltage Vu is Vin−Vc1, that is, Vin/2, the voltage Vv is Vin−Vc2, that is, Vin/2, and the voltage V1 is Vu−Vv, that is, 0.

Figure 4A:
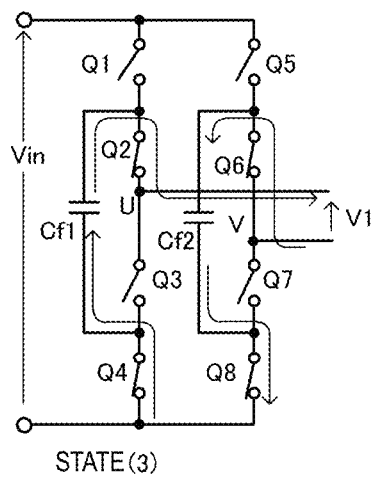
FIGS. 4A to 4D are diagrams illustrating a path of a current flowing through the full-bridge circuit 10 in each of states illustrated in FIG. 2.
Figure 4B:
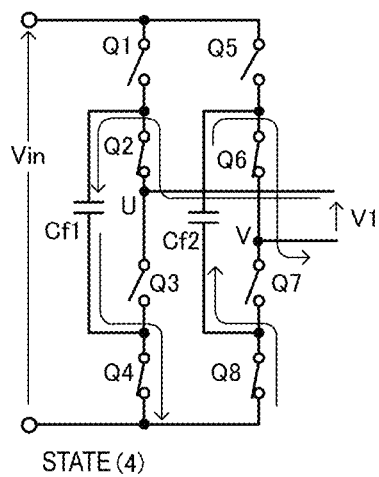

When the switching elements Q2, Q4, Q6, and Q8 are in the ON states and the switching elements Q1, Q3, Q5, and Q7 are in the OFF states, a current flows through the paths illustrated in FIGS. 4A and 4B. Also in this case, the voltage V1 is 0, but the direction in which the current flows is opposite between FIGS. 4A and 4B. This depends on the relative charge and discharge states of the first floating capacitor Cf1 and the second floating capacitor Cf2.

Figure 4C:
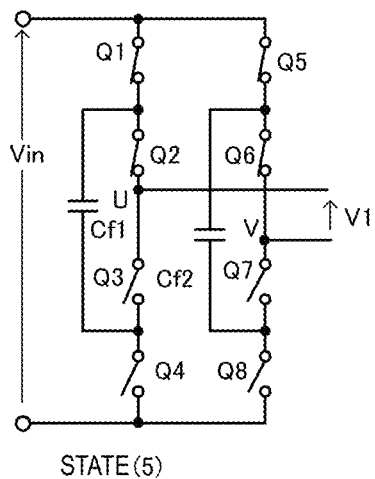
Figure 4D:
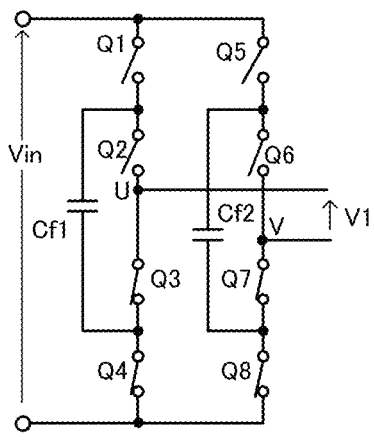

Also when the switching elements Q1, Q2, Q5, and Q6 are in the ON states and the switching elements Q3, Q4, Q7, and Q8 are in the OFF states, as illustrated in FIG. 4C, the voltage V1=0. When the switching elements Q3, Q4, Q7, and Q8 are in the ON states and the switching elements Q1, Q2, Q5, and Q6 are in the OFF states, as illustrated in FIG. 4D, the voltage V1 is 0.

(V1=Vin/2)

Figure 5A:
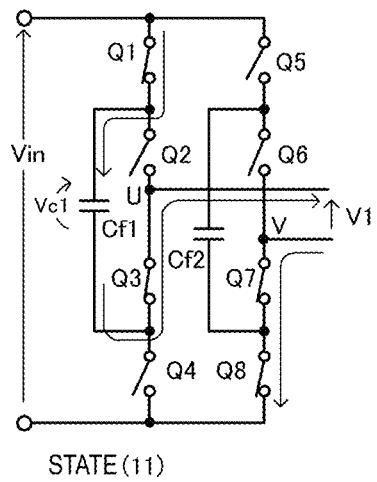
FIGS. 5A to 5D are diagrams illustrating a path of a current flowing through the full-bridge circuit 10 in each of states illustrated in FIG. 2.
Figure 5B:
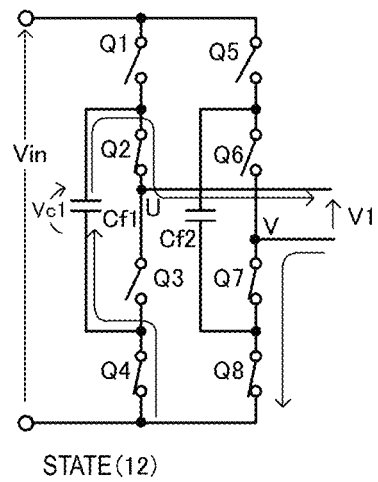

When the switching elements Q1, Q3, Q7, and Q8 are in the ON states and the switching elements Q2, Q4, Q5, and Q6 are in the OFF states, a current flows through the path illustrated in FIG. 5A. In this case, the voltage Vu is Vin−Vc1, that is, Vin/2, the voltage Vv is 0, and the voltage V1 is Vu−Vv, that is, Vin/2. When the switching elements Q2, Q4, Q7, and Q8 are in the ON states and the switching elements Q1, Q3, Q5, and Q6 are in the OFF states, a current flows through the path illustrated in FIG. 5B. In this case, the voltage Vu is Vc1, that is, Vin/2, the voltage Vv is 0, and the voltage V1 is Vu−Vv, that is, Vin/2. The voltage Vu is the voltage Vc1 with which the first floating capacitor Cf1 has been charged in the state illustrated in FIG. 5A.

Figure 5C:
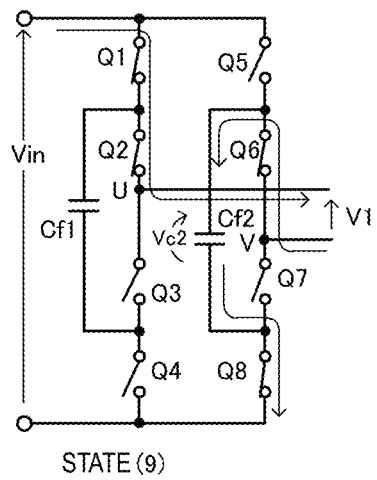
Figure 5D:
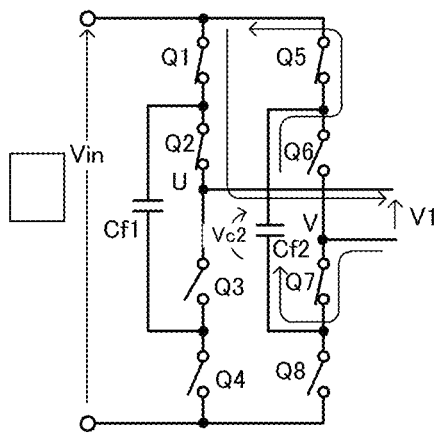

When the switching elements Q1, Q2, Q6, and Q8 are in the ON states and the switching elements Q3, Q4, Q5, and Q7 are in the OFF states, a current flows through the path illustrated in FIG. 5C. Also when the switching elements Q1, Q2, Q5, and Q7 are in the ON states and the switching elements Q3, Q4, Q6, and Q8 are in the OFF states, a current flows through the path illustrated in FIG. 5D, and the voltage V1 is Vin/2. In this case, the voltage Vu is the voltage Vc2 with which the second floating capacitor Cf2 has been charged in the state illustrated in FIG. 5C.

(V1=−Vin/2)

When the switching elements Q3, Q4, Q5, and Q7 are in the ON states and the switching elements Q1, Q2, Q6, and Q8 are in the OFF states, a current flows through the path illustrated in FIG. 6A. In this case, the voltage Vu is 0, the voltage Vv is Vin−Vc2, that is, Vin/2, and the voltage V1 is Vu−Vv, that is, −Vin/2. When the switching elements Q3, Q4, Q6, and Q8 are in the ON states and the switching elements Q1, Q2, Q5, and Q7 are in the OFF states, a current flows through the path illustrated in FIG. 6B. In this case, the voltage Vu is 0, the voltage Vv is Vc2, that is, Vin/2, and the voltage V1 is Vu−Vv, that is, −Vin/2. The voltage Vv is the voltage Vc2 with which the second floating capacitor Cf2 has been charged in the state illustrated in FIG. 6A.

When the switching elements Q2, Q4, Q5, and Q6 are in the ON states and the switching elements Q1, Q3, Q7, and Q8 are in the OFF states, a current flows through the path illustrated in FIG. 6C, and the voltage V1 is −Vin/2. When the switching elements Q1, Q3, Q5, and Q6 are in the ON states and the switching elements Q2, Q4, Q7, and Q8 are in the OFF states, a current flows through the path illustrated in FIG. 6D, and the voltage V1 is −Vin/2. In this case, the voltage Vv is the voltage Vc1 with which the first floating capacitor Cf1 has been charged in the state illustrated in FIG. 6C.

Thus, the full-bridge circuit 10 operates in any one of the full-bridge operation mode, the half-bridge operation mode, and the five-level operation mode. In the five-level operation mode, the output periods of the five voltage levels are determined by a period during which the voltage Vu is Vin/2 and the phase difference between the voltages Vu and Vv.

When the full-bridge circuit 10 operates in the full-bridge operation mode, the voltage V1 transition is performed in a manner of V1→−V1→V1→V1→ and the like in one cycle of the drive frequency. FIG. 7 illustrates an example of a combination from the 16 states illustrated in FIG. 2, which satisfies the above-described conditions. That is, the state (7) and the state (8) are alternately repeated.

When the full-bridge circuit 10 operates in the half-bridge operation mode, the voltage V1 transition is performed in a manner of V1/2→−V1/2→V1/2→−V1/2→ and the like in one cycle of the drive frequency. FIG. 8 illustrates an example of combinations from the 16 states illustrated in FIG. 2, which satisfy the above-described conditions. That is, in the half-bridge operation mode, there are 12 combinations as illustrated in FIG. 8. When the full-bridge circuit 10 operates in the five-level operation mode, the voltage V1 transition is performed in a manner of 0→Vin/2→Vin→Vin/2→0→−Vin/2→−Vin→Vin/2→0 in one cycle of the drive frequency. FIG. 9, FIG. 10, and FIG. 11 illustrate an example of combinations from the 16 states illustrated in FIG. 2, which satisfy the above-described conditions. FIG. 9, FIG. 10 and FIG. 11 are tables showing transition patterns of the operation modes illustrated in FIG. 2 in "one switching cycle" in the five-level operation mode.

FIG. 12 is a waveform chart illustrating ON/OFF states of the switching elements Q1 to Q8 in the full-bridge operation mode, the half-bridge operation mode, and the five-level operation mode.

Figure 13:
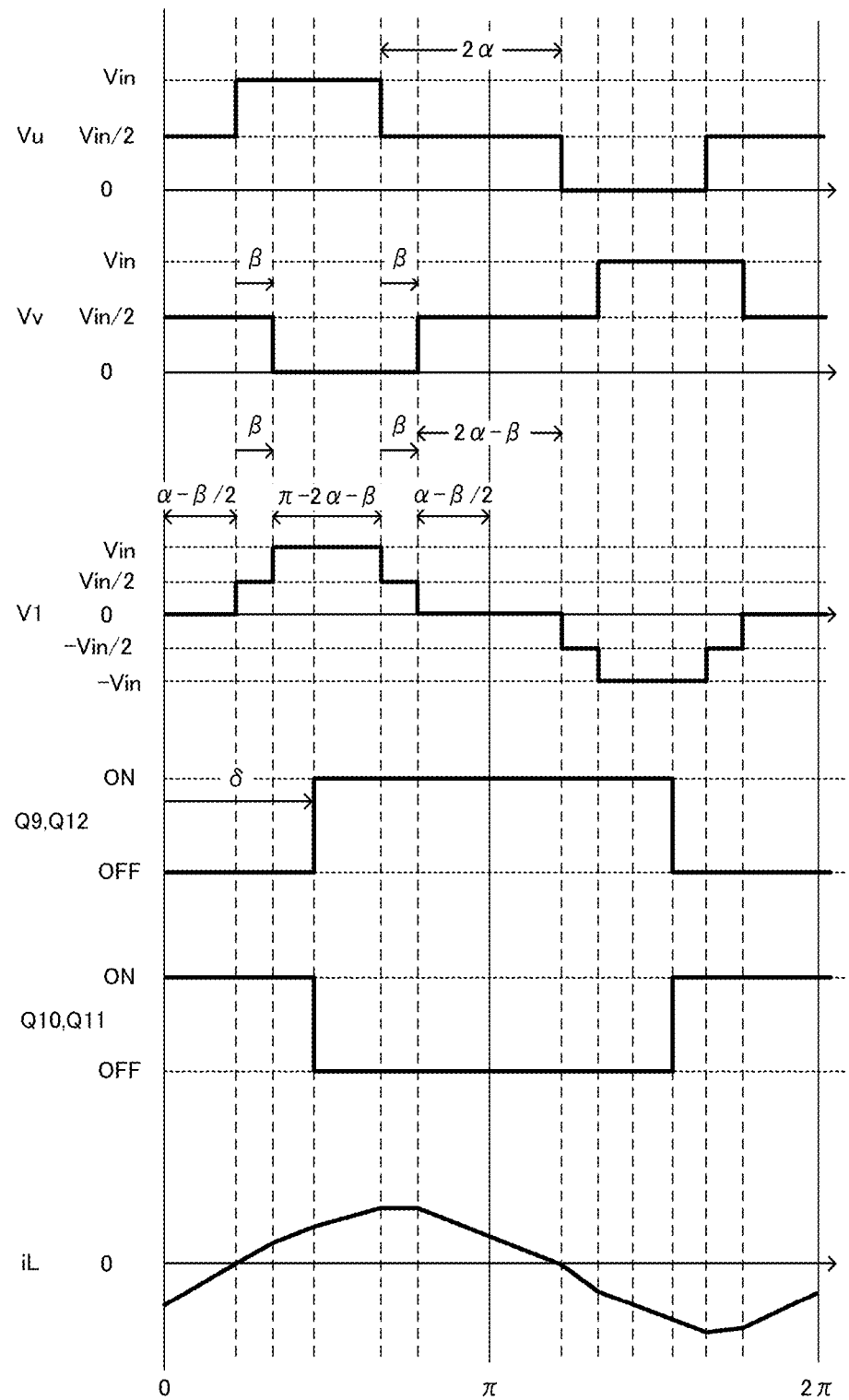
FIG. 13 is a waveform chart of the voltages Vu, Vv, V1 and a current iL flowing through an inductor L1 at positions of the full-bridge circuit 10.

FIG. 13 is a waveform chart of the voltages Vu, Vv, V1 and a current iL flowing through the inductor L1 at each of the positions of the full-bridge circuit 10. In FIG. 13, phase 0 corresponds to peak timing of a reference carrier to be described later, and phase π corresponds to a bottom timing of the reference carrier to be described later.

α shown in FIG. 13 is the period during which the voltage Vu is Vin/2 in one cycle. Further, β is the phase difference between the voltages Vu and Vv. A period during which the voltage V1 is 0 is 2α−β, a period during which the voltage V1 is Vin/2 is 2β, and a period during which the voltage V1 is Vin is π−2α−β. Values of α and β define output periods of the voltages of the five levels.

FIG. 13 also illustrates switching timings of the switching element Q9 to Q12 of the full-bridge circuit 20. The controller 32 turns ON and OFF the switching elements Q9 and Q12 and the switching elements Q10 and Q11 at a duty ratio of 50%. δ is switching phase difference between the full-bridge circuits 10 and 20. The transmission power of the DC-DC converter 1 is controlled by α, β and δ. In particular, even in the same operation mode, the on-duty ratio of the second full-bridge circuit 20 is changed by changing δ. Therefore, the controller 32 maintains the output voltage at a specified value by adjusting δ.

Figure 14:
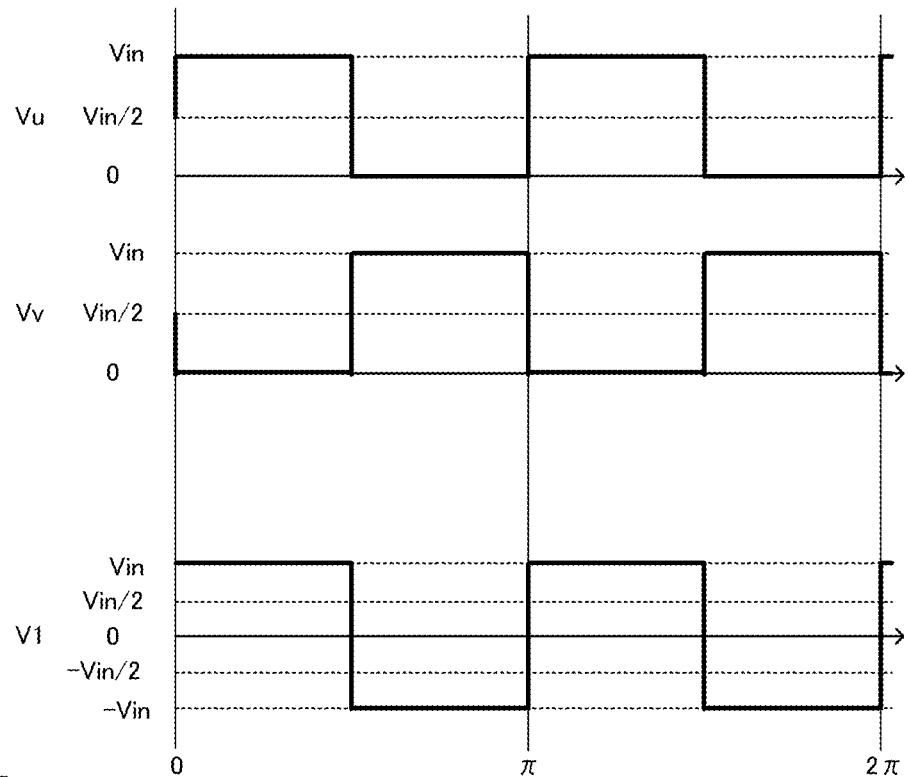
FIG. 14 is a chart illustrating voltage waveforms of the voltages Vu, Vv and V1 of the full-bridge circuit 10 in the case of α, β=0.

When the switching control is performed on the full-bridge circuit 10 such that α and β are 0, the voltage V1 is ±Vin. FIG. 14 is a chart illustrating voltage waveforms of the voltages Vu, Vv and V1 of the full-bridge circuit 10 in the case of α, β=0. As illustrated in FIG. 14, the full-bridge circuit 10 operates in the full-bridge operation mode.

Figure 15:
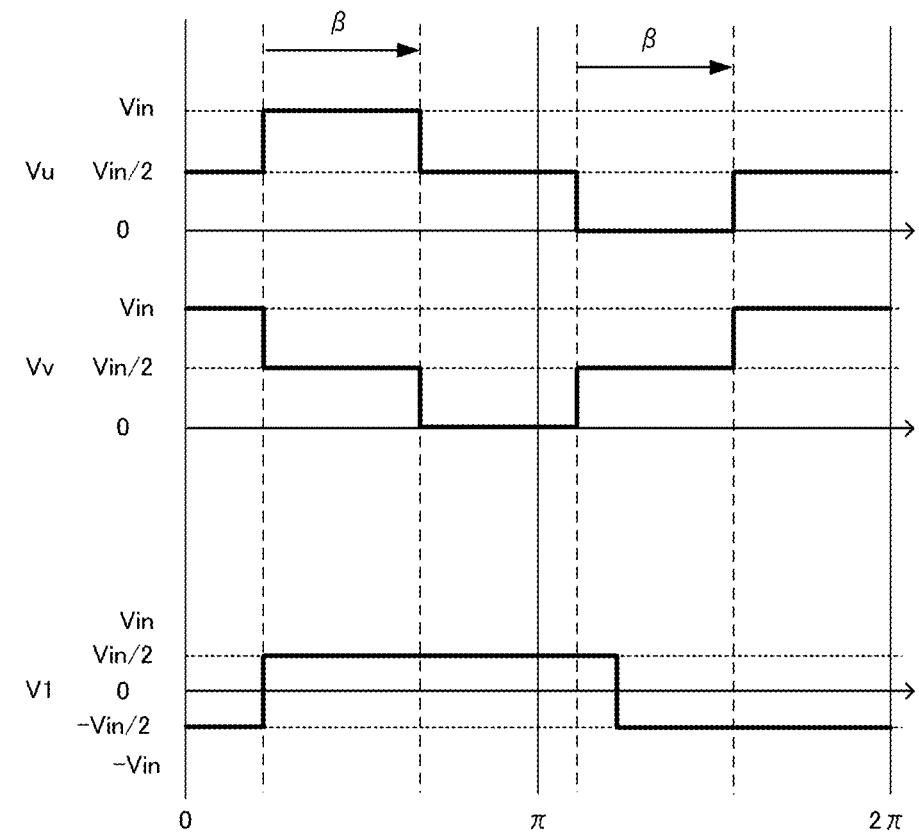
FIG. 15 is a chart illustrating voltage waveforms of the voltages Vu, Vv and V1 of the full-bridge circuit 10 in the case of a α=π/4 and β=π/2.

When the switching control is performed on the full-bridge circuit 10 such that α is π/4 and β is π/2, the voltage V1 is ±Vin/2. FIG. 15 is a chart illustrating voltage waveforms of the voltages Vu, Vv and V1 of the full-bridge circuit 10 in the case of α=π/4 and β=π/2. As illustrated in FIG. 15, the full-bridge circuit 10 operates in the half-bridge operation mode.

Figure 16:
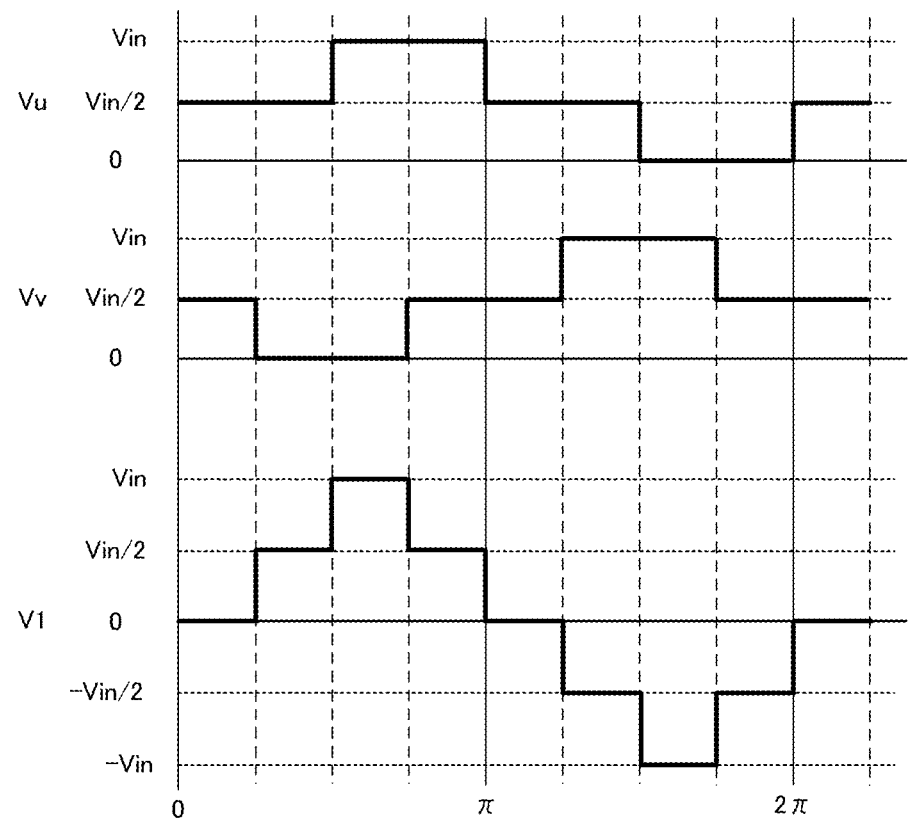
FIG. 16 is a chart illustrating voltage waveforms of the voltages Vu, Vv and V1 of the full-bridge circuit 10 in the case of α=β=π/4.

Further, when the switching control is performed on the full-bridge circuit 10 such that α and β are π/4, the voltage V1 operates in the five-level operation mode of transition among ±Vin, ±Vin/2, and 0 in a stepwise manner as illustrated in FIG. 16.

The DC-DC converter 1 according to the present preferred embodiment outputs the three voltage levels and is able to therefore be operated with high efficiency in accordance with load variations in the load connected to the DC-DC converter 1. In the case of a common isolated two-level DC-DC converter, the ZVS range is limited by the input/output voltage ratio and the winding number ratio of the transformer. Therefore, when the input/output voltage ratio is large, connection of a light load to the two-level DC-DC converter causes the two-level DC-DC converter to deviate from the ZVS operation range. Accordingly, there is a possibility that the ZVS operation cannot be performed. As a result, a reactive current which does not contribute to the transmission power is increased, and transmission efficiency of the DC-DC converter is deteriorated. By contrast, in the present preferred embodiment, the operation mode of the DC-DC converter 1 is determined in accordance with the load variation, so that the DC-DC converter 1 is able to be operated with high efficiency. A method of determining the operation mode of the full-bridge circuit 10 will be described below.

Figure 17:
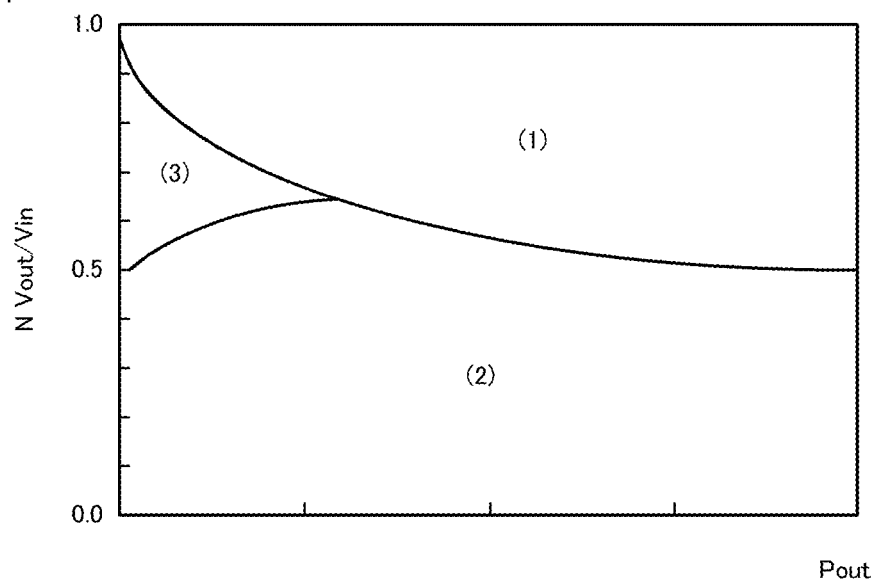
FIG. 17 is a graph illustrating a relationship between output power Pout and an input/output voltage ratio of the DC-DC converter 1.

FIG. 17 is a graph showing a relationship between the output power Pout and the input/output voltage ratio of the DC-DC converter 1. The input/output voltage ratio may be expressed by NVout/Vin. Note that N is the winding number ratio (N:1) between the primary winding n1 and the secondary winding n2 of the transformer T1. An area (1) is a control range of the full-bridge operation mode, an area (2) is a control range of the half-bridge operation mode, and an area (3) is a control range of the five-level operation mode.

For example, when NVout/Vin is about 1.0, the operation mode of the DC-DC converter 1 is set to the full-bridge operation mode. When NVout/Vin is lower than about 0.6, in the area excluding the area (3), the operation mode of the DC-DC converter 1 is set to be the half-bridge operation mode. When NVout/Vin is lower than about 1.0, in the area excluding the above-described areas (1) and (2), the operation mode of the DC-DC converter 1 is set to the five-level operation mode.

In this manner, by setting the operation mode in accordance with the input/output voltage ratio and the output power Pout, the DC-DC converter 1 is able to perform the ZVS operation in a wide load variation range. Therefore, the reactive current is able to be reduced or prevented to enable the DC-DC converter 1 to operate with high efficiency. In addition, also in the area (3) where the zero voltage switching cannot be performed in the existing two-level DC-DC converter, the zero voltage switching is able to be performed in the present preferred embodiment, thus performing the zero voltage switching in a wide load variation range.

For example, in the half-bridge operation mode, instead of the method in which the switching elements Q1, Q3, Q7, and Q8 and the switching elements Q2, Q4, Q5, and Q6 are alternately turned ON and OFF, switching control of alternately turning ON and OFF the switching elements Q1, Q2, Q6, and Q8 and the switching elements Q3, Q4, Q5, and Q7 may be performed. In this case, the current flows through the second floating capacitor Cf2, so that the voltage V1 is ±Vin/2.

Next, phase shift control in switching of the operation mode will be described.

Figure 18A:
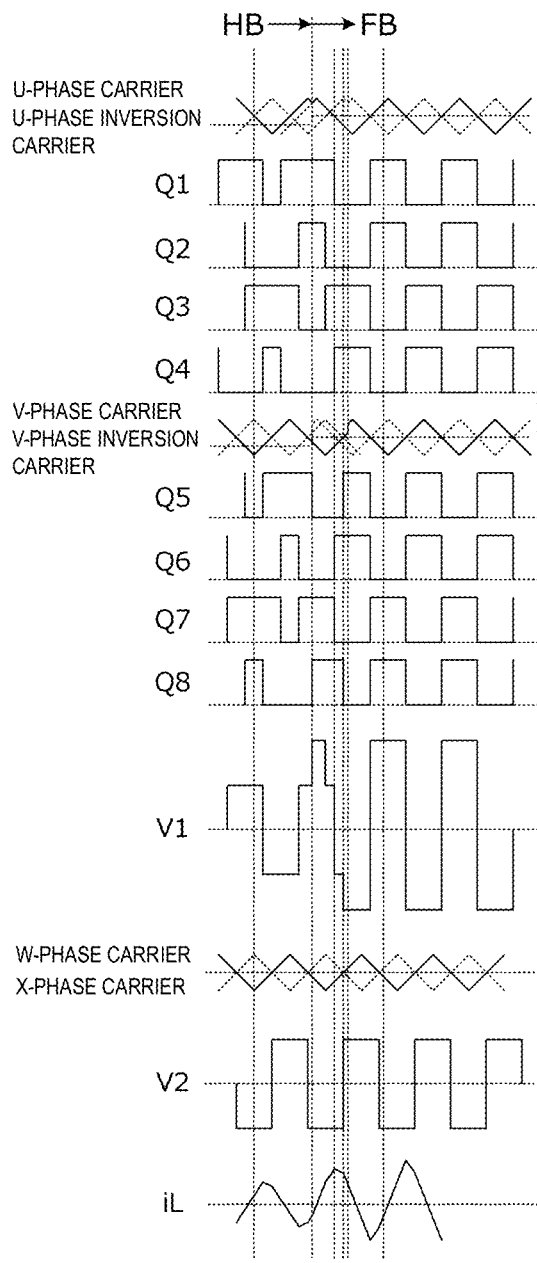
FIG. 18A illustrates waveform charts of each of the portions when an operation mode is switched from the half-bridge operation mode to the full-bridge operation mode in the DC-DC converter in a preferred embodiment of the present invention.
Figure 18B:
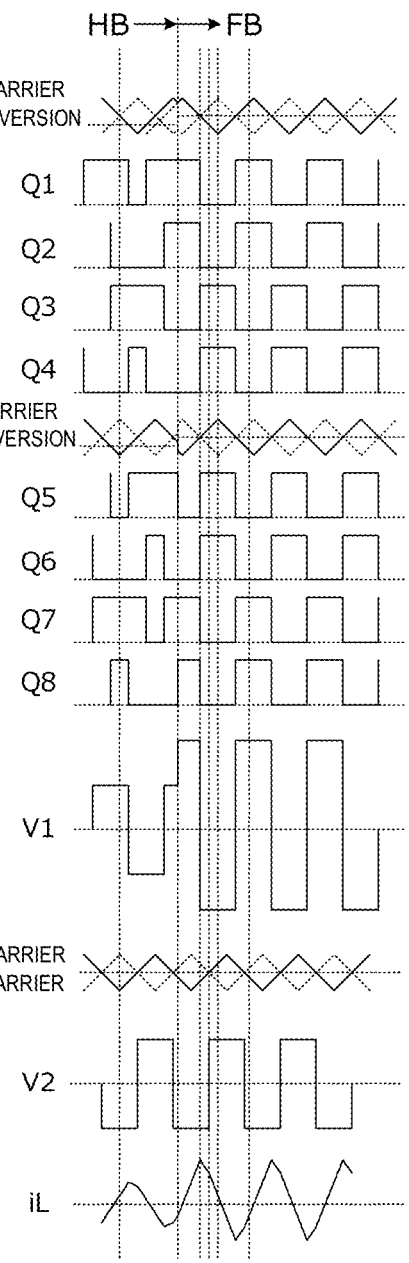
FIG. 18B illustrates waveform charts of each of the portions when the operation mode is switched from the half-bridge operation mode to the full-bridge operation mode in a DC-DC converter in a comparative example.
Figure 19:
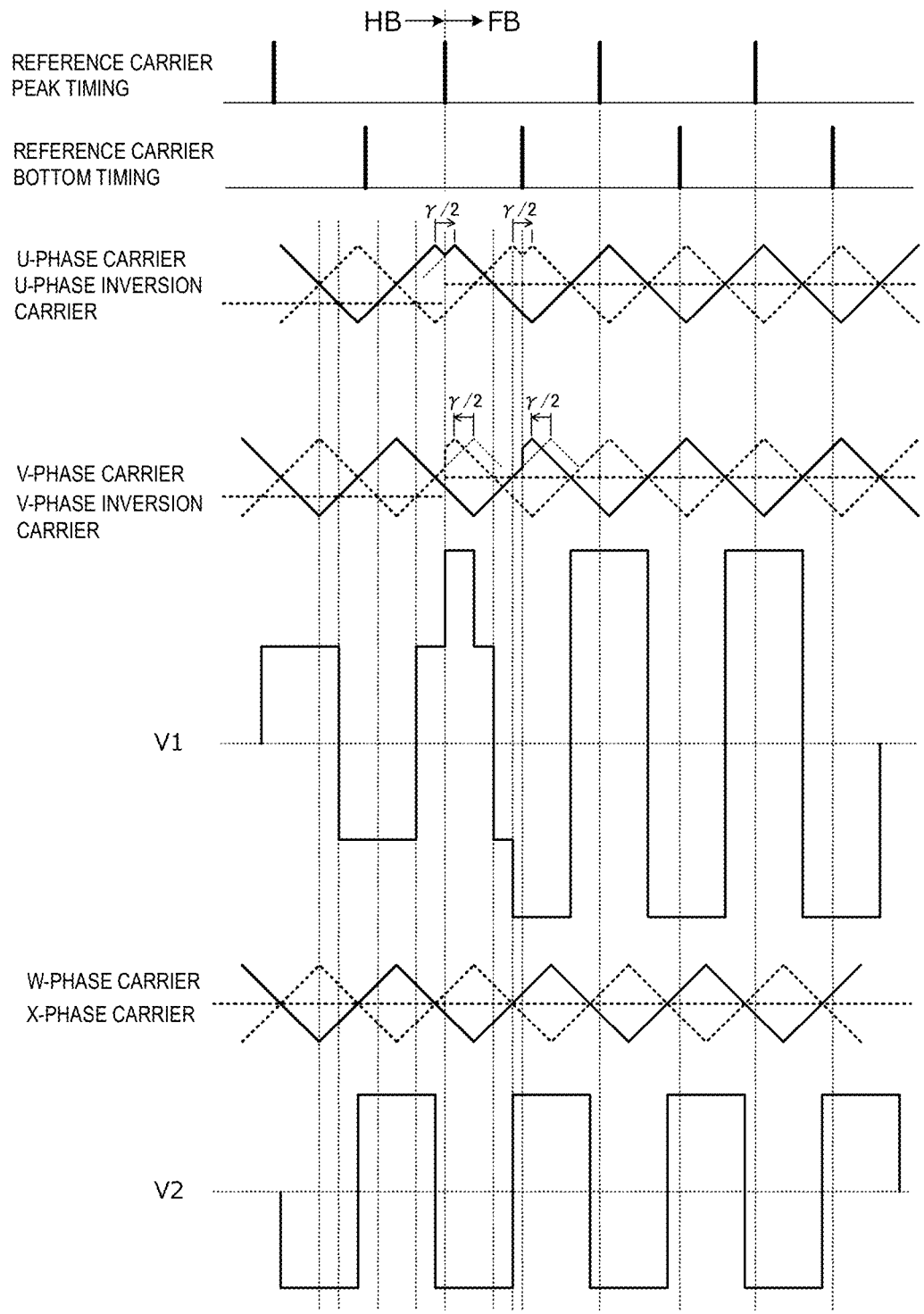
FIG. 19 is an enlarged view of main waveforms in FIG. 18A.

FIG. 18A illustrates waveform charts of each of the portions when the operation mode is switched from the half-bridge operation mode to the full-bridge operation mode in the DC-DC converter in the present preferred embodiment. FIG. 18B illustrates waveform charts of each of the portions when the operation mode is switched from the half-bridge operation mode to the full-bridge operation mode in a DC-DC converter in a comparative example. FIG. 19 is an enlarged view of main waveforms in FIG. 18A.

Figure 20A:
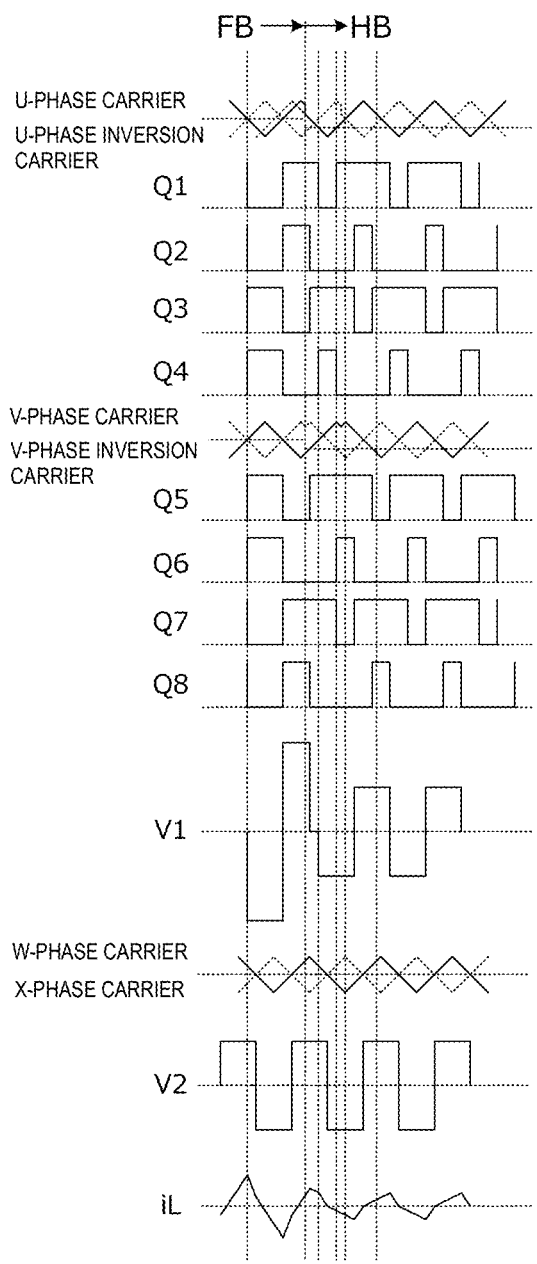
FIG. 20A illustrates waveform charts of each of the portions when the operation mode is switched from the full-bridge operation mode to the half-bridge operation mode in the DC-DC converter in ae preferred embodiment of the present invention.
Figure 20B:
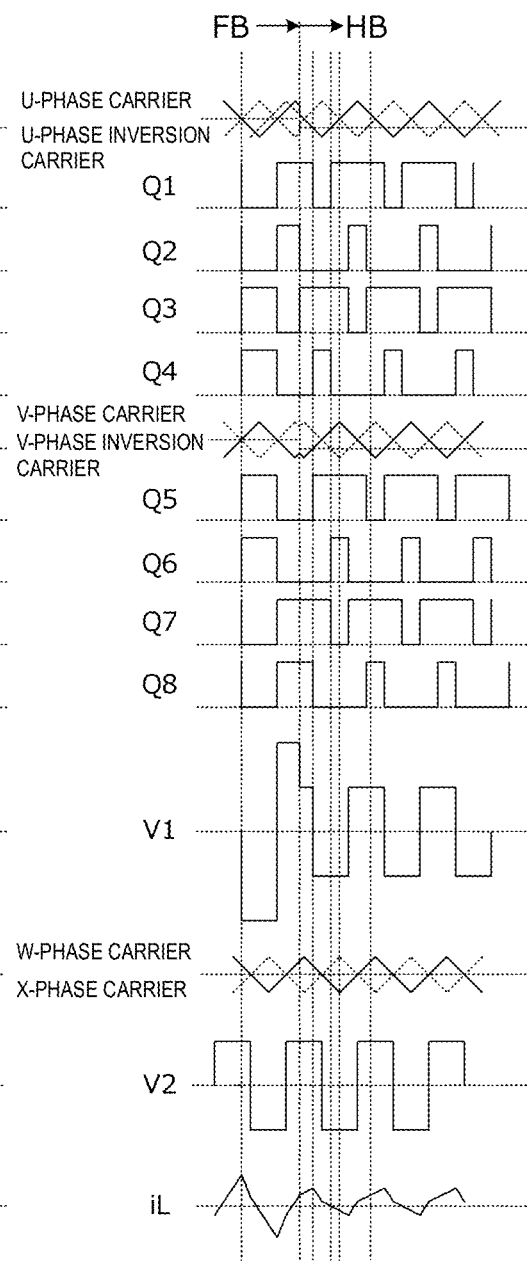
FIG. 20B illustrates waveform charts of each of the portions when the operation mode is switched from the full-bridge operation mode to the half-bridge operation mode in the DC-DC converter in the comparative example.
Figure 21:
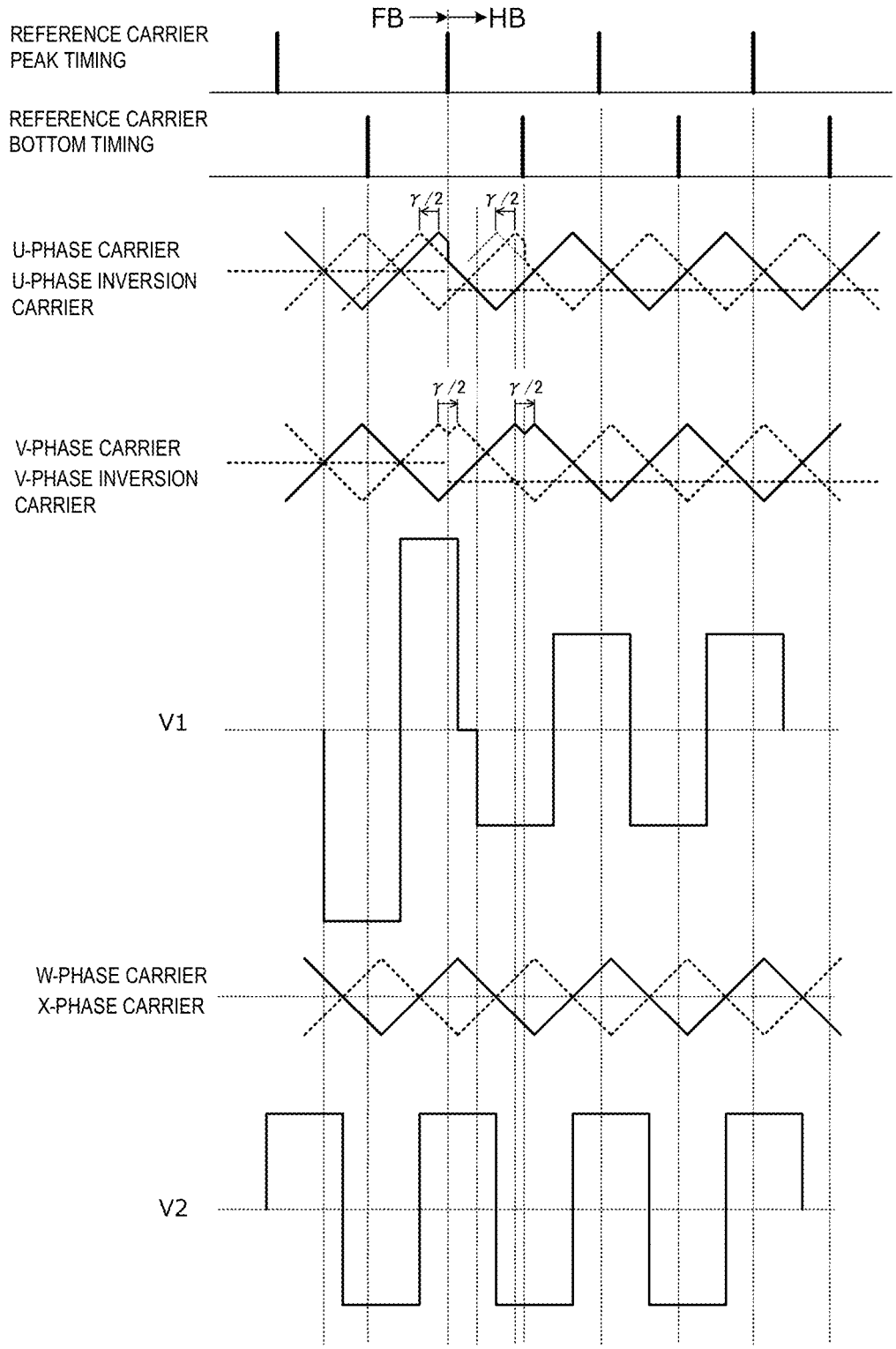
FIG. 21 is an enlarged view of main waveforms in FIG. 20A.

FIG. 20A illustrates waveform charts of each of the portions when the operation mode is switched from the full-bridge operation mode to the half-bridge operation mode in the DC-DC converter in the present preferred embodiment. FIG. 20B illustrates waveform charts of each of the portions when the operation mode is switched from the full-bridge operation mode to the half-bridge operation mode in the DC-DC converter in a comparative example. FIG. 21 is an enlarged view of main waveforms in FIG. 20A.

In FIGS. 18A and 18B, FIG. 19, and FIGS. 20A and 20B, a voltage V2 is an input voltage of the second full-bridge circuit 20. In FIG. 19 and FIG. 21, the peak timing of the reference carrier is a reference cycle timing of the drive frequency, and the bottom timing of the reference carrier is a half cycle timing of the reference cycle of the drive frequency.

In FIGS. 18A and 18B, FIG. 19, FIGS. 20A and 20B, and FIG. 21, a U-phase carrier and a U-phase inversion carrier are values defining the switching phases of the first high-side switches Q1 and Q2 or the first low-side switches Q3 and Q4, and a V-phase carrier and a V-phase inversion carrier are values defining the switching phases of the second high-side switches Q5 and Q6 or the second low-side switches Q7 and Q8. A W-phase carrier is a value defining the switching phases of the third high-side switch Q9 and the fourth low-side switch Q12, and an X-phase carrier is a value defining the switching phases of the third low-side switch Q10 and the fourth high-side switch Q11.

The DC-DC converter in the comparative example is configured to shift phases of the U-phase carrier, the U-phase inversion carrier, the V-phase carrier, and the V-phase inversion carrier in switching of the operation mode.

In FIGS. 18A and 18B and FIGS. 20A and 20B, the U-phase carrier, the U-phase inversion carrier, the V-phase carrier, and the V-phase inversion carrier are count values of a reference clock, and the values thereof are represented by triangular waveforms. Horizontal broken lines superimposed on the triangular waveforms are reference values compared with these carriers in magnitude.

As illustrated in FIG. 19 and FIG. 21, the DC-DC converter 1 in the present preferred embodiment switches the operation mode at the peak timing of the reference carrier. The phase of the U-phase carrier is shifted at the peak timing of the reference carrier. The phase of the U-phase inversion carrier is shifted at the bottom timing of the reference carrier.

The phase shift of the carriers is performed by adding or subtracting values corresponding to the phase shift amounts to and from the count values of the reference clock.

In the example illustrated in FIG. 19, in the switching from the half-bridge operation mode (HB) to the full-bridge operation mode (FB), the phase of the U-phase carrier is shifted by γ/2 in the delay direction, and the phase of the V-phase inversion carrier is shifted by γ/2 in the advancement direction. Further, the phase of the U-phase inversion carrier is shifted by γ/2 in the delay direction, and the phase of the V-phase carrier is shifted by γ/2 in the advancement direction.

In the example illustrated in FIG. 21, in the switching from the full-bridge operation mode (FB) to the half-bridge operation mode (HB), the phase of the U-phase carrier is shifted by γ/2 in the advancement direction, and the phase of the V-phase inversion carrier is shifted by γ/2 in the delay direction. Further, the phase of the U-phase inversion carrier is shifted by γ/2 in the advancement direction, and the phase of the V-phase carrier is shifted by γ/2 in the delay direction.

γ is a new phase shift amount for the switching phase difference between the U phase and the V phase, which is generated with the switching of the operation mode. In this manner, by shifting the phases of each of the carriers in two portions in one cycle of the drive frequency (for each half cycle), a difference between positive and negative voltage time products of the output voltage V1 of the first full-bridge circuit 10 in the switching of the operation mode is decreased. That is, DC offset in the switching of the operation mode is able to be reduced or prevented.

As is apparent from comparison between the inductor current iL in FIG. 18A and the inductor current iL in FIG. 18B, ripples and the DC offset are reduced or prevented. Similarly, as is apparent from comparison between the inductor current iL in FIG. 20A and the inductor current iL in FIG. 20B, the DC offset is reduced or prevented.

Not only in the switching from the full-bridge operation mode (FB) to the half-bridge operation mode (HB) or in the switching from the half-bridge operation mode (HB) to the full-bridge operation mode (FB), but also in switching between the other operation modes, the DC offset is able to be reduced or prevented in the same or similar manner as will be described below.

FIG. 22A illustrates waveform charts of each of the portions when the operation mode is switched from the full-bridge operation mode to the five-level operation mode in the DC-DC converter in the present preferred embodiment. FIG. 22B illustrates waveform charts of each of the portions when the operation mode is switched from the full-bridge operation mode to the five-level operation mode in the DC-DC converter in the comparative example.

Figure 23A:
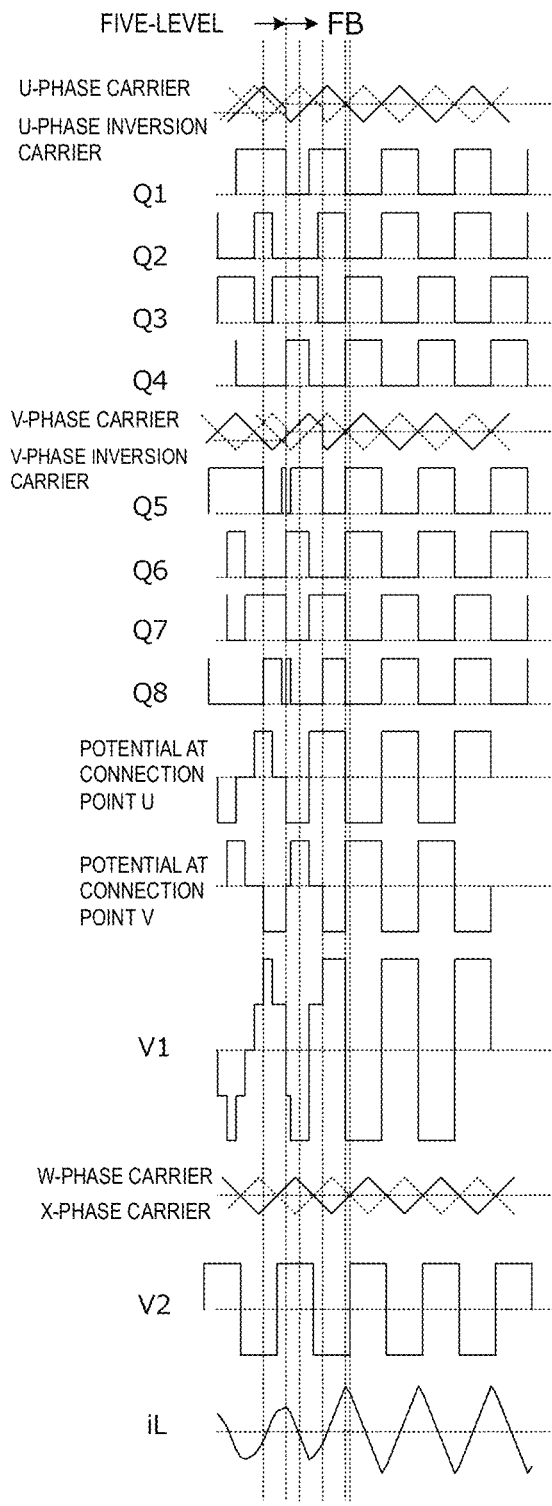
FIG. 23A illustrates waveform charts of each of the portions when the operation mode is switched from the five-level operation mode to the full-bridge operation mode in the DC-DC converter in a preferred embodiment of the present invention.
Figure 23B:
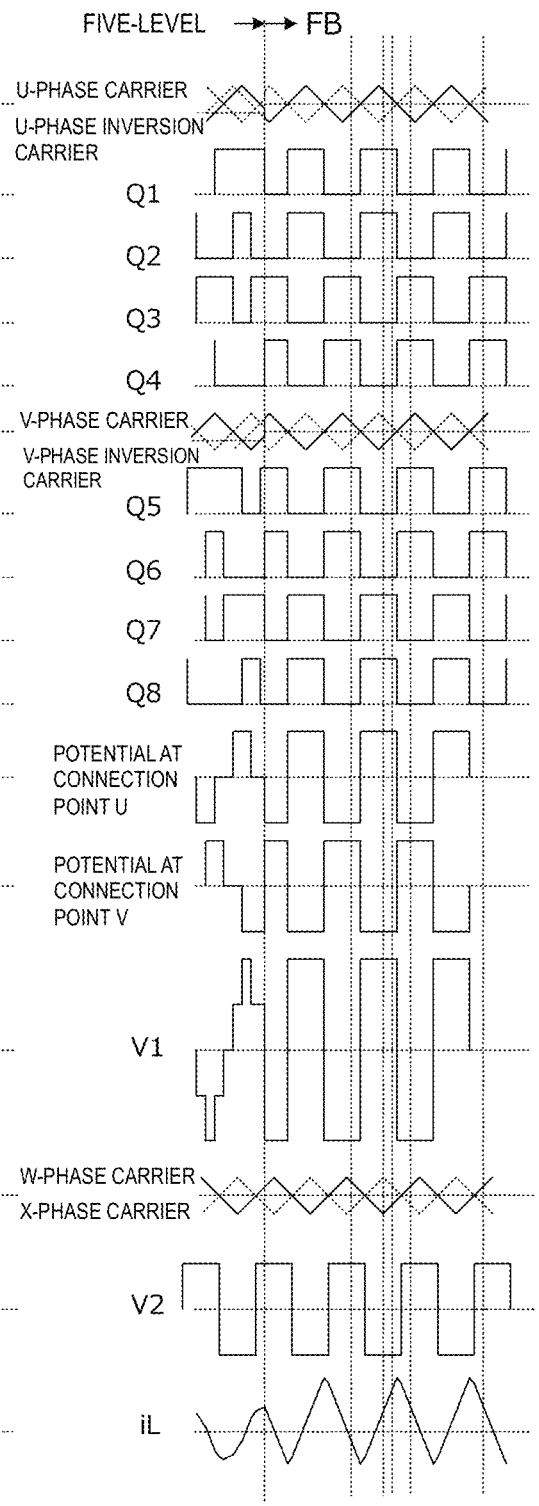
FIG. 23B illustrates waveform charts thereof in the comparative example.

FIG. 23A illustrates waveform charts of each of the portions when the operation mode is switched from the five-level operation mode to the full-bridge operation mode in the DC-DC converter in the present preferred embodiment. FIG. 23B illustrates waveform charts of each of the portions when the operation mode is switched from the five-level operation mode to the full-bridge operation mode in the DC-DC converter in the comparative example.

Figure 24A:
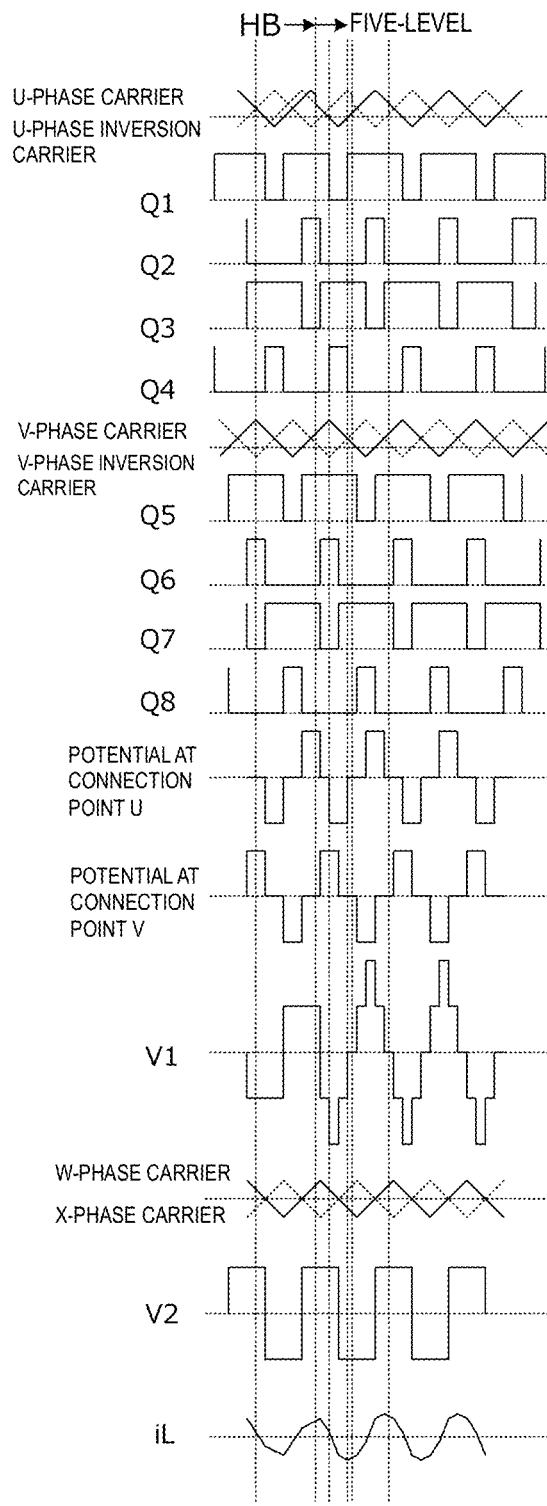
FIG. 24A illustrates waveform charts of each of the portions when the operation mode is switched from the half-bridge operation mode to the five-level operation mode in the DC-DC converter in a preferred embodiment of the present invention.
Figure 24B:
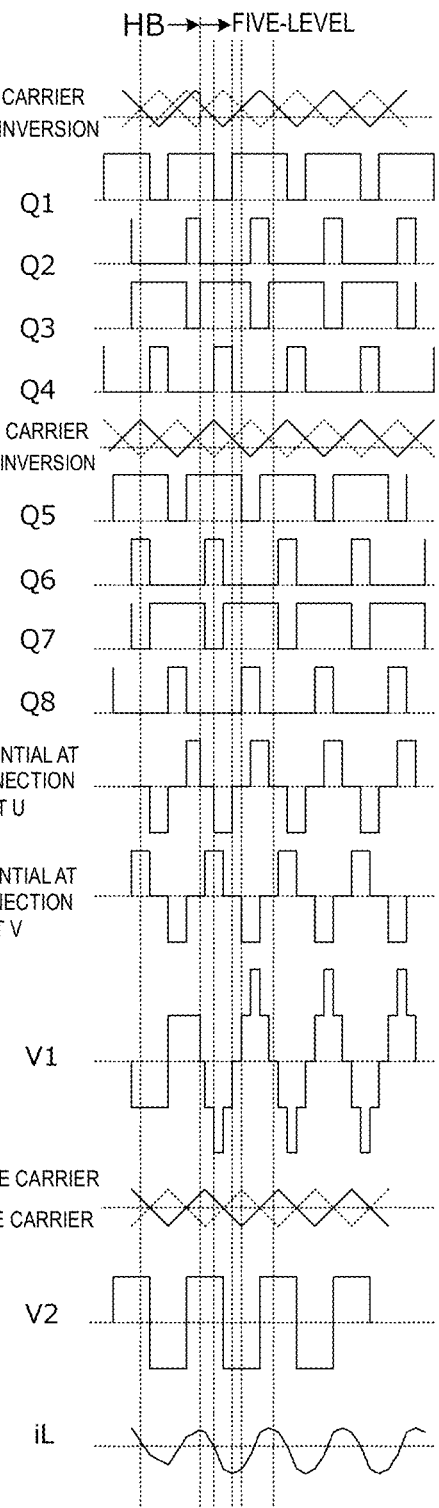
FIG. 24B illustrates waveform charts thereof in the comparative example.

FIG. 24A illustrates waveform charts of each of the portions when the operation mode is switched from the half-bridge operation mode to the five-level operation mode in the DC-DC converter in the present preferred embodiment. FIG. 24B illustrates waveform charts of each of the portions when the operation mode is switched from the half-bridge operation mode to the five-level operation mode in the DC-DC converter in the comparative example.

FIG. 25A illustrates waveform charts of each of the portions when the operation mode is switched from the five-level operation mode to the half-bridge operation mode in the DC-DC converter in the present preferred embodiment. FIG. 25B illustrates waveform charts of each of the portions when the operation mode is switched from the five-level operation mode to the half-bridge operation mode in the DC-DC converter in the comparative example.

In FIGS. 22A and 22B, FIGS. 23A and 23B, FIGS. 24A and 24B, and FIGS. 25A and 25B, the voltage V2 is the input voltage of the second full-bridge circuit 20.

Next, phase shift control when the transmission power changes while the operation mode remains unchanged will be described.

Figure 26:
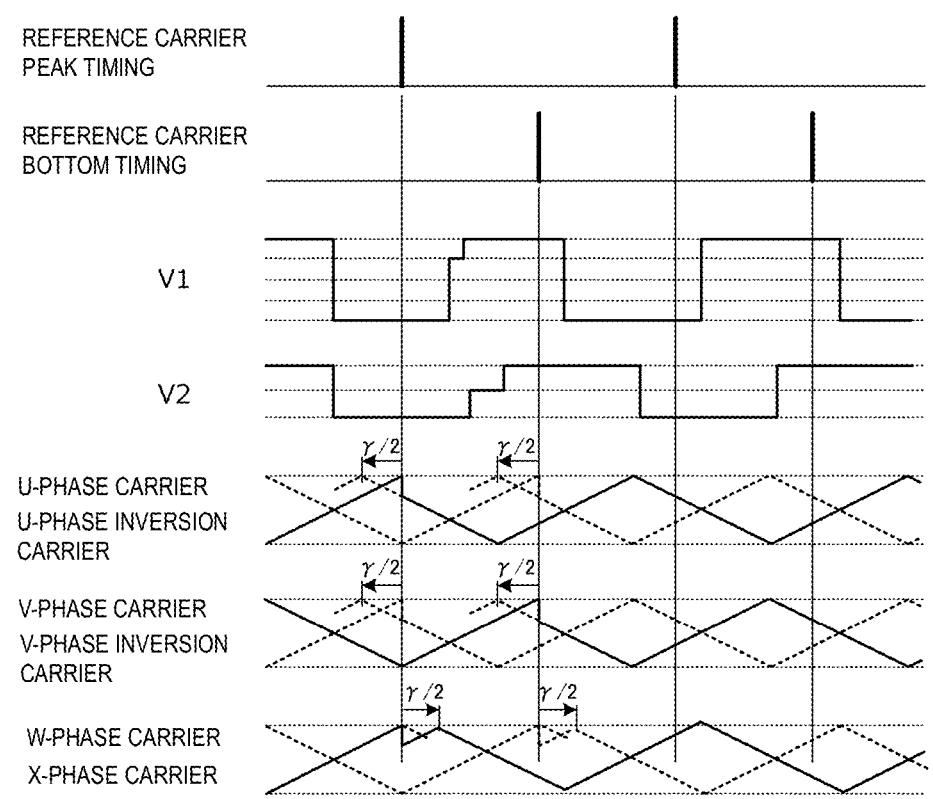
FIG. 26 is a chart illustrating waveforms of each of the portions before and after phase shift when transmission power is changed in the DC-DC converter in a preferred embodiment of the present invention.

FIG. 26 is a chart illustrating waveforms of each of the portions before and after phase shift when the transmission power is changed in the DC-DC converter in the present preferred embodiment. As illustrated in FIG. 26 drawing, the phases of the U-phase carrier, the V-phase inversion carrier, and the W-phase carrier are shifted at the peak timing of the reference carrier, and the phases of the U-phase inversion carrier, the V-phase carrier, and the X-phase carrier are shifted at the bottom timing of the reference carrier.

Next, an example of a phase shift method other than the method in which the phases of the carriers are shifted will be described.

Figure 27:
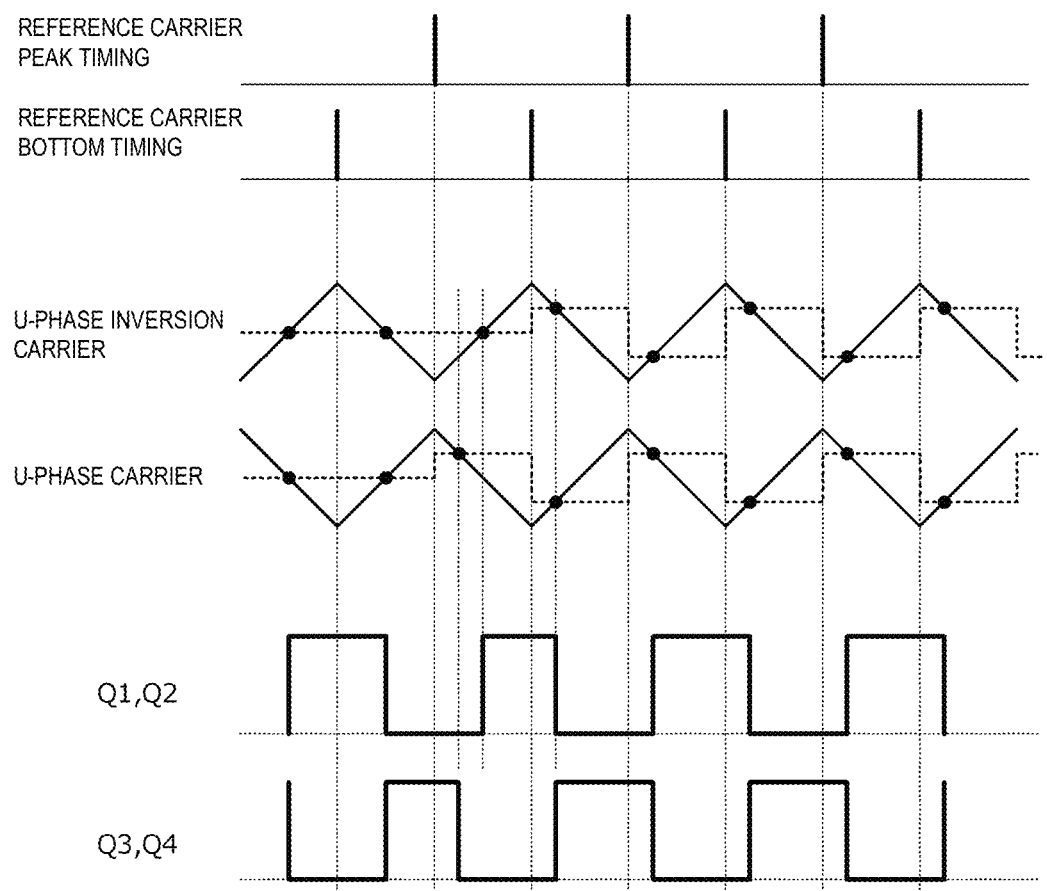

FIG. 27 is a waveform chart illustrating changes in each of the carriers and reference values as comparison targets thereof, and the like. In particular, portions for shifting the switching phases of the first high-side switches Q1 and Q2 and the first low-side switches Q3 and Q4 are described. In FIG. 27, the U-phase carrier is generated with reference to the peak timing of the reference carrier, and the U-phase inversion carrier is generated with reference to the bottom timing of the reference carrier. The U-phase carrier and the U-phase inversion carrier are count values of the reference clock, and these values are represented by triangular waveforms. Broken lines in rectangular waveforms, which are superimposed on the triangular waveforms, are reference values compared with the carriers in magnitude.

The same applies to the shift of the switching phases of the second high-side switches (Q5, Q6) and the second low-side switches (Q7, Q8).

In this manner, the switching phases of the first high-side switches Q1 and Q2 and the first low-side switches Q3 and Q4 may be shifted by varying the reference values in synchronization with the cycles of the carriers.

The shift amounts of the phase shift in the switching of the operation mode and the shift amounts of the phase shift in the change of the transmission power as described above are determined such that positive and negative output voltages of the first full-bridge circuit are balanced before and after the phase shift control. In other words, the phase shift is performed such that energy stored in the inductor is equal or substantially equal between the positive and negative thereof before and after the operation mode is switched. This also means that the phase shift is performed in the direction in which the current flowing through the inductor L1 decreases before and after the operation mode is switched.

In the example described above, the full-bridge circuit 10 of the DC-DC converter 1 is configured to operate in any one of the full-bridge operation mode, the half-bridge operation mode, and the five-level operation mode. Alternatively, the full-bridge circuit 10 may be configured to operate in the full-bridge operation mode or the half-bridge operation mode. Even in this case, since there is no need to provide two circuits, that is, the full-bridge circuit and the half-bridge circuit, it is possible to reduce or prevent an increase in size.

In the preferred embodiments described above, the voltage that is applied to both ends of the primary winding of the transformer in the full-bridge operation mode is the DC voltage Vin and the voltage that is applied to both ends of the primary winding of the transformer in the half-bridge operation mode is the half (Vin/2) of the DC voltage. However, they may also contain some errors. For example, the DC voltage Vin and/or Vin/2 may vary due to variations in the parasitic capacitances of the FETs, manufacturing errors, and the like.

In the example illustrated in FIG. 1, the inductor L1 is connected to the primary side of the transformer T1. The inductor may however be connected to the secondary side. Further, inductors may be connected to both of the primary side and the secondary side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter comprising:
   a first full-bridge circuit that includes a first leg including a first high-side switch and a first low-side switch, and a second leg including a second high-side switch and a second low-side switch, and in which a first DC voltage is applied to the first leg and the second leg;
   a second full-bridge circuit that includes a third leg including a third high-side switch and a third low-side switch, and a fourth leg including a fourth high-side switch and a fourth low-side switch, and in which a second DC voltage is applied to the third leg and the fourth leg;
   a transformer that includes a primary winding connected to an input/output portion of the first full-bridge circuit and a secondary winding connected to an input/output portion of the second full-bridge circuit, and that isolates the first full-bridge circuit and the second full-bridge circuit; and
   a controller that controls the first full-bridge circuit and the second full-bridge circuit; wherein
   the first high-side switch includes a first switching element connected to a high-side line and a second switching element connected in series to the first switching element;
   the first low-side switch includes a fourth switching element connected to a low-side line and a third switching element connected in series to the fourth switching element;
   the second high-side switch includes a fifth switching element connected to the high-side line and a sixth switching element connected in series to the fifth switching element;
   the second low-side switch includes an eighth switching element connected to the low-side line and a seventh switching element connected in series to the eighth switching element;
   the first full-bridge circuit includes a first floating capacitor connected between a connection point of the first switching element and the second switching element and a connection point of the third switching element and the fourth switching element, and a second floating capacitor connected between a connection point of the fifth switching element and the sixth switching element and a connection point of the seventh switching element and the eighth switching element;
   an inductor connected in series to at least one of between the input/output portion of the first full-bridge circuit and the primary winding and between the input/output portion of the second full-bridge circuit and the secondary winding is provided;
   the controller operates the first to eighth switching elements of the first full-bridge circuit and switches of the second full-bridge circuit at a same drive frequency;
   the controller controls any one of:
   a full-bridge operation mode of controlling the first to eighth switching elements of the first full-bridge circuit such that an absolute value of a peak value of a voltage of the input/output portion of the first full-bridge circuit is the first DC voltage over a half cycle of the drive frequency;
   a half-bridge operation mode of controlling the first to eighth switching elements of the first full-bridge circuit such that the absolute value of the peak value of the voltage of the input/output portion of the first full-bridge circuit is half of the first DC voltage over the half cycle; and
   a five-level operation mode of switching the first to eighth switching elements of the first full-bridge circuit into a state of performing a full-bridge operation and a state of performing a half-bridge operation to output voltages of five levels from the first full-bridge circuit during a period of one cycle of the drive frequency; and
   the controller shifts switching phases of the first high-side switch and the second low-side switch at a reference cycle timing of the drive frequency and shifts switching phases of the first low-side switch and the second high-side switch at a half-cycle timing of the reference cycle of the drive frequency in a cycle in which an operation mode is switched from one operation mode to another operation mode among the full-bridge operation mode, the half-bridge operation mode, and the five-level operation mode, and determines shift amounts of the phases such that positive and negative output voltages of the first full-bridge circuit are balanced before and after the operation mode is switched.

2. The DC-DC converter according to claim 1, wherein the controller determines switching phases of the first to eighth switching elements of the first full-bridge circuit based on a U-phase carrier and a U-phase inversion carrier which define the switching phase of the first high-side switch or the first low-side switch and a V-phase carrier and a V-phase inversion carrier which define the switching phase of the second high-side switch or the second low-side switch; and the controller shifts phases of the U-phase carrier and the V-phase inversion carrier at the reference cycle timing of the drive frequency and shifts phases of the U-phase inversion carrier and the V-phase carrier at the half-cycle timing of the reference cycle of the drive frequency.

3. The DC-DC converter according to claim 2, wherein the U-phase carrier, the U-phase inversion carrier, the V-phase carrier, and the V-phase inversion carrier are count values of a reference clock;

the controller controls the first full-bridge circuit and the second full-bridge circuit based on a comparison between the count values and reference values; and shift amounts of the phases are determined by a change in the count values.

4. The DC-DC converter according to claim 2, wherein the U-phase carrier, the U-phase inversion carrier, the V-phase carrier, and the V-phase inversion carrier are count values of a reference clock;

the controller controls the first full-bridge circuit and the second full-bridge circuit based on a comparison between the count values and reference values; and shift amounts of the phases are determined by a change in the reference values.

5. The DC-DC converter according to claim 1, further comprising input/output terminals connected to an input capacitor and the first full-bridge circuit.

6. The DC-DC converter according to claim 1, wherein the first to eighth switching elements are n-type MOS-FETs.

7. The DC-DC converter according to claim 1, further comprising input/output terminals connected to an input capacitor and the second full-bridge circuit.

8. The DC-DC converter according to claim 7, wherein the input/output terminals are provided with an output voltage detection circuit and a load current detection circuit.

9. The DC-DC converter according to claim 1, wherein a winding number ratio of the primary winding and the secondary winding is set to N:1.

* * * * *